United States Patent
Kamomae et al.

(10) Patent No.: US 8,654,384 B2
(45) Date of Patent: Feb. 18, 2014

(54) IMAGE FORMING APPARATUS AND IMAGE FORMING SYSTEM

(75) Inventors: Katsuhisa Kamomae, Osaka (JP); Shinya Ogawa, Osaka (JP); Masaki Sone, Osaka (JP)

(73) Assignee: Kyocera Mita Corporation (JP)

( * ) Notice: Subject to any disclaimer, the term of this patent is extended or adjusted under 35 U.S.C. 154(b) by 275 days.

(21) Appl. No.: 13/220,831

(22) Filed: Aug. 30, 2011

(65) Prior Publication Data

US 2012/0050808 A1    Mar. 1, 2012

(30) Foreign Application Priority Data

Aug. 31, 2010   (JP) ................................ 2010-193765
Aug. 31, 2010   (JP) ................................ 2010-194112
Aug. 31, 2010   (JP) ................................ 2010-194113

(51) Int. Cl.
    *G03G 15/00*        (2006.01)
(52) U.S. Cl.
    USPC ........... 358/1.15; 358/1.14; 358/400; 399/18; 399/19; 399/21
(58) Field of Classification Search
    USPC ......... 358/1.4, 1.6, 1.14, 1.15, 400, 401, 405; 399/18, 19, 21
    See application file for complete search history.

(56) References Cited

U.S. PATENT DOCUMENTS

| | | | |
|---|---|---|---|
| 8,201,921 B2 * | 6/2012 | Okada et al. | 347/42 |
| 2005/0018242 A1 * | 1/2005 | Azami | 358/1.15 |
| 2007/0067683 A1 * | 3/2007 | Yamanaka | 714/100 |
| 2008/0212983 A1 * | 9/2008 | Park et al. | 399/18 |
| 2009/0317096 A1 * | 12/2009 | Odaira | 399/21 |
| 2010/0086338 A1 * | 4/2010 | Hara et al. | 399/406 |
| 2010/0118328 A1 * | 5/2010 | Sakuraba | 358/1.14 |

FOREIGN PATENT DOCUMENTS

JP        2006-159727      6/2006

* cited by examiner

*Primary Examiner* — Jerome Grant, II
(74) *Attorney, Agent, or Firm* — Gerald E. Hespos; Michael J. Porco; Matthew T. Hespos

(57) ABSTRACT

An image forming apparatus to be network-connected is provided with an acquirer for requesting event information indicating a specific event having occurred in another image forming apparatus via a network and acquiring the event information transmitted via the network in response to this request, and a processor for performing a predetermined process to deal with the specific event when the event information is acquired by the acquirer.

16 Claims, 17 Drawing Sheets

IMAGE FORMING APPARATUS AND IMAGE FORMING SYSTEM

BACKGROUND OF THE INVENTION

1. Field of the Invention

The present invention relates to an image forming apparatus and an image forming system, particularly to a technology compatible with an event which occurs in an image forming apparatus.

2. Description of the Background Art

In a known conventional image forming apparatus, a user is notified when a problem relating to an operation performed in the image forming apparatus frequently occurs. For example, an image forming apparatus which counts the number of errors such as a jam at a pickup roller of a sheet cassette and the like, judges that cleaning of the pickup roller is necessary when the error number reaches a predetermined number, and notifies a warning message to the effect that cleaning should be performed to the user by means of a display unit has been proposed as such an image forming apparatus.

However, in the case of the above conventional image forming apparatus, a warning message is notified to the user after an error such as a jam actually occurs in the image forming apparatus. That is, in the case of the above conventional image forming apparatus, a warning message can be notified only after an error such as a jam occurs at the pickup roller many times.

Since respective image forming apparatuses on a network differ in executable performances in some cases, even if a certain image forming apparatus obtains information such as an error number at a pickup roller from another image forming apparatus, this information is not necessarily useful in the image forming apparatus having obtained the information and this image forming apparatus cannot necessarily accurately deal with operations and events which can occur therein.

Further, in the case of the above conventional image forming apparatus, notification is made by judgment on the importance of the occurrence of a specific event based only on an occurrence frequency of this event in the image forming apparatus. Thus, it is required to further increase accuracy of judgment as to whether or not an event having occurred is important as against the conventional image forming apparatus.

SUMMARY OF THE INVENTION

An object of the present invention is to provide an image forming apparatus and an image forming system capable of efficiently dealing with a specific event which occurs in the image forming apparatus.

In order to accomplish this object, one aspect of the present invention is directed to an image forming apparatus to be network-connected, comprising an acquirer for requesting event information indicating a specific event having occurred in another image forming apparatus via a network and acquiring the event information transmitted via the network in response to the request; and a processor for performing a predetermined process to deal with the specific event when the event information is acquired by the acquirer.

Another aspect of the present invention is directed to an image forming system in which an image forming apparatus and another image forming apparatus are network-connected, wherein the image forming apparatus includes an acquirer for requesting event information indicating a specific event having occurred in the other image forming apparatus via a network to the other image forming apparatus and acquiring the event information transmitted via the network in response to the request; and a processor for performing a predetermined process to deal with the specific event when the event information is acquired by the acquirer.

Still another aspect of the present invention is directed to an image forming system in which an image forming apparatus, another image forming apparatus and a server are network-connected, wherein the image forming apparatus includes an acquirer for requesting event information indicating a specific event having occurred in the other image forming apparatus via a network to the server and acquiring the event information transmitted from the server via the network in response to the request; and a processor for performing a predetermined process to deal with the specific event when the event information is acquired by the acquirer.

These and other objects, features and advantages of the present invention will become more apparent upon reading the following detailed description along with the accompanying drawings.

DETAILED DESCRIPTION OF THE PREFERRED EMBODIMENTS

First Embodiment

Figure 1:
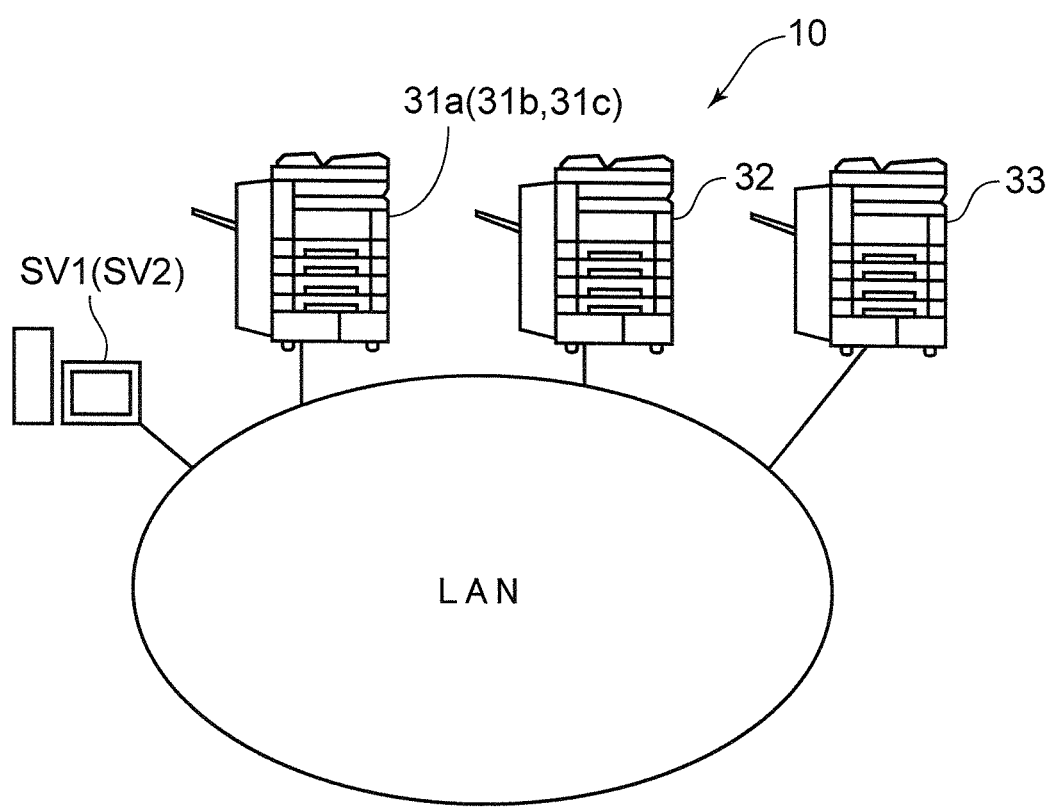
FIG. 1 is a diagram showing a network configuration of image forming apparatuses and a server constituting an image forming system according to a first embodiment.

Hereinafter, a first embodiment of an image forming apparatus and an image forming system according to the present invention is described with reference to the drawings. FIG. 1 is a diagram showing a network configuration of image forming apparatuses and a server constituting an image forming system according to a first embodiment.

An image forming system 10 includes a server and a plurality of image forming apparatuses which are so connected as to be capable of data communication with each other by a network such as a LAN (Local Area Network). In the first embodiment, the image forming system 10 includes one sever and three complex machines. However, the numbers of server (s) and image forming apparatus(s) included in an image forming system according to the present invention are not limited to these numbers. For example, as described later, the image forming system 10 may be composed of only a plurality of complex machines.

Complex machines 31a, 32 and 33 according to the first embodiment have a copy function, a facsimile function, a printer function, a scanner function and other functions. Since the functions and constructions of the complex machines 31a, 32 and 33 are similar, the complex machine 31a is described below. The complex machine 31a stores data of a document read by an image reading unit including a scanner and the like in an internal storage device of the complex machine 31a, a storage unit in a server SV1 connected to the complex machine 31a via an intranet or the like. Further, the complex machine 31a prints out data stored in the internal storage device of the complex machine 31a and performs other operations. The respective complex machines 31a, and 33 and server SV1 are capable of data communication with each other.

Figure 2:
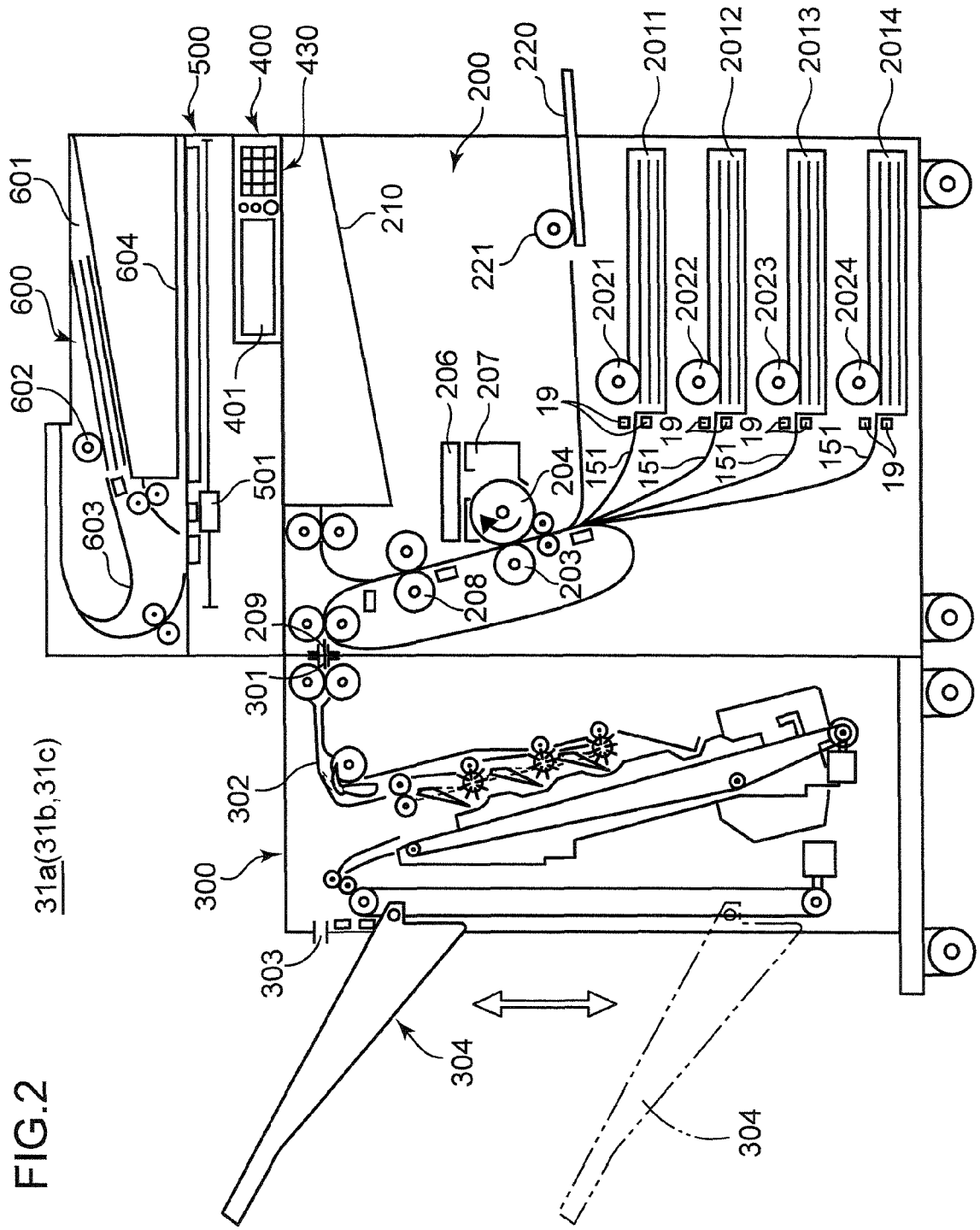
FIG. 2 is a front view in section showing a schematic construction of a complex machine according to the first embodiment.

Next, the construction of the complex machine 31a is described. FIG. 2 is a front view in section showing a schematic construction of the complex machine according to the first embodiment. The complex machine 31a includes a main unit 200, a sheet post-processing unit 300 arranged at a sheet carry-out side of the main unit 200, e.g. at a left side, an operation unit 400 used by a user to enter various operation commands and the like, an image reading unit 500 arranged atop the main unit 200, and a document feeding unit 600 arranged atop the image reading unit 500.

The operation unit 400 includes a display unit (display means) 410 composed of an LCD (Liquid Crystal Display) and the like and an operation key unit 430, by means of which operation instructions are entered by an operator. The display unit 410 is a touch panel unit as a combination of a touch panel and an LCD, or the like. The display unit 410 displays various operation screens and enables the operator to enter execution commands for various functions such as an instruction to switch an operation of displaying on the display unit 410 to another operation by touching a display surface (displayed operation keys). The operation key unit 430 includes a start key, a numerical pad and the like.

The document feeding unit 600 includes a document placing portion 601, a feed roller 602, a document conveying portion 603 and a document discharging portion 604, and the image reading unit 500 includes a scanner 501. The feed roller 602 feeds a necessary number of documents set on the document placing portion 601 one by one, and the document conveying portion 603 successively conveys the fed documents to a reading position of the scanner 501. The scanner 501 successively reads images of the documents being conveyed and the read documents are discharged to the document discharging portion 604.

The main unit 200 includes a plurality of sheet cassettes 201, a plurality of feed rollers 202, a transfer roller 203, a photoconductive drum 204, an exposure device 206, a developing device 207, a fixing roller 208, a discharge port 209, a discharge tray 210 and the like. Note that the transfer roller 203, the photoconductive drum 204, the exposure device 206, the developing device 207 and the fixing roller 208 constitute an image forming unit 130 to be described later.

The photoconductive drum 204 is uniformly charged by a charger (not shown) while being rotated in a direction of an arrow. The exposure device 206 scans the photoconductive drum 204 with a laser beam modulated in accordance with image data of a document read by the image reading unit 500 to form an electrostatic latent image on a drum surface. The developing device 207 supplies black developer to the photoconductive drum 204 to form a toner image.

On the other hand, pickup rollers 2021 to 2024 are provided at the respective sheet cassettes 2011 to 2014. By driving the pickup rollers 2021 to 2024, recording sheets P are fed one by one from recording sheet stacks stored in the sheet cassettes 2011 to 2014, and the fed recording sheets are fed to the transfer roller 203. The transfer roller 203 causes a toner image on the photoconductive drum 204 to transfer to a conveyed print sheet, and the fixing roller 208 fixes the transferred toner image to the print sheet by heating the transferred toner image. Thereafter, the print sheet is carried into the sheet post-processing unit 300 through the discharge port 209 of the main unit 200. Further, the print sheet is discharged to the discharge tray 210 if necessary. The sheet cassette 2011 and the pickup roller 2021 are described below as representative examples.

A sheet detection sensor 19 for detecting whether or not a recording sheet P has passed the pickup roller 2021 of the sheet cassette 2011 and whether or not there is a sheet jam (jam) at an arrangement position of the pickup roller 2021 is, for example, provided downstream of the pickup roller 2021 of the sheet cassette 2011 with respect to a sheet conveying direction. The sheet detection sensor 19 includes, for example, an optical sensor composed of a light emitting element and a light receiving element. The light emitting element of the sheet detection sensor 19 is arranged on a side wall as a part of a sheet conveyance path 151, and the light receiving element is provided at a position of a side wall part of the sheet conveyance path 151 facing the light emitting element where light emitted from the light emitting element can be received. This sheet detection sensor 19 may be arranged at a plurality of positions in the sheet conveyance path 151 or the sheet cassette. The light emitting element of the sheet detection sensor 19 is, for example, a light-emitting diode and the light receiving element thereof is, for example, a photoresistor.

The sheet post-processing unit 300 includes a carry-in port 301, a print sheet conveying portion 302, a carry-out port 303, a stack tray 304 and the like. The print sheet conveying portion 302 successively conveys print sheets carried into the carry-in port 301 from the discharge port 209 and finally discharges the print sheets to the stack tray 304 through the carry-out port 303. The stack tray 304 is constructed to be vertically movable in directions of arrows according to the number of the stacked print sheets carried out through the carry-out port 303.

Figure 3:
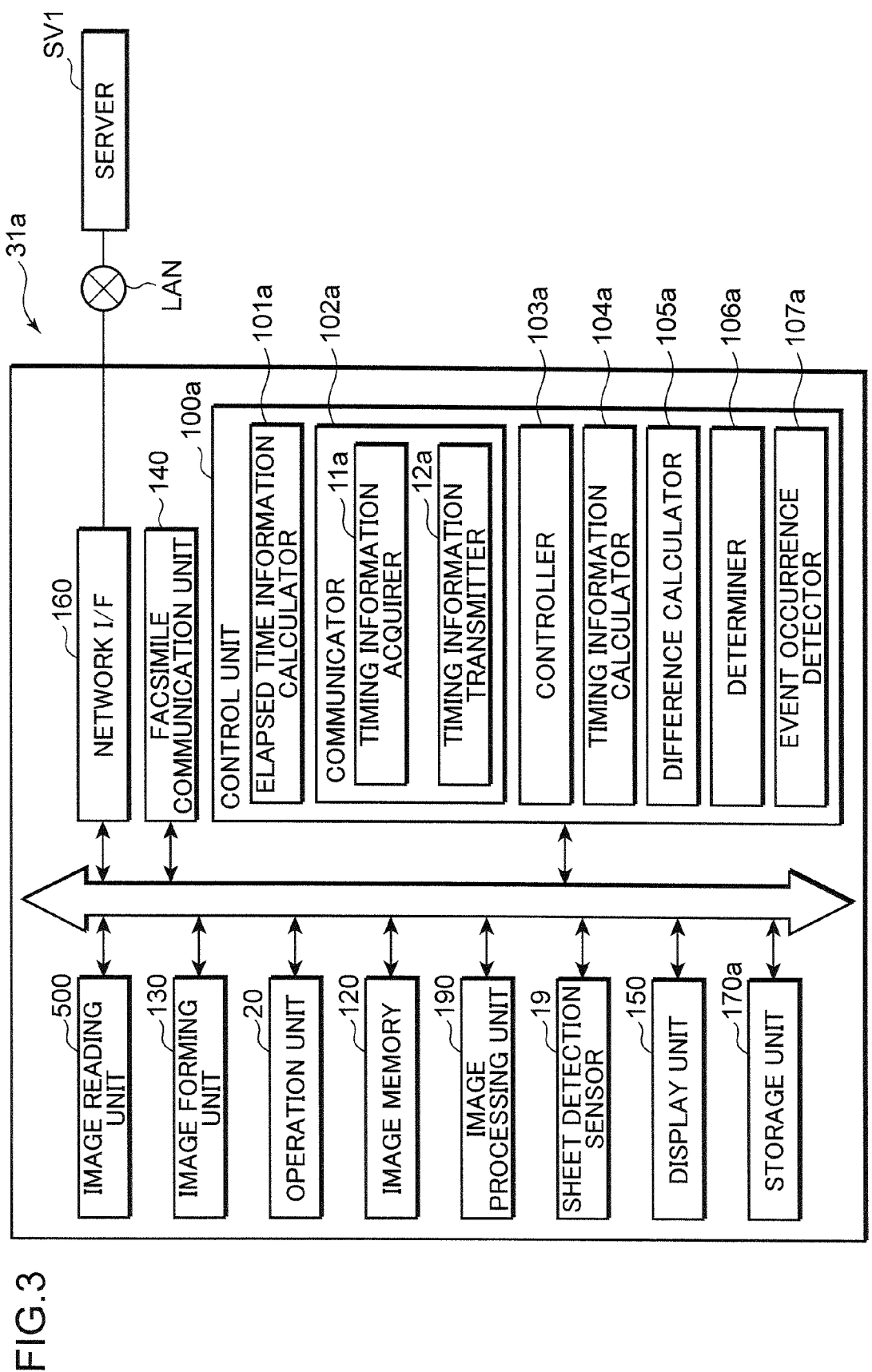
FIG. 3 is a block diagram schematically showing the internal construction of the complex machine according to the first embodiment.

FIG. 3 is a block diagram schematically showing the internal construction of the complex machine 31a. The construction of the complex machine 31a (32, 33) described below is not necessarily an essential element as the image forming apparatus according to the present invention, and can be one embodiment of the image forming apparatus according to the present invention if including a construction necessary to perform processes in the respective embodiments to be described later. A timing information acquirer 11a described below constitutes an example of an acquirer, and a difference calculator 105a, a determiner 106a and a controller 103a constitute an example of a processor.

The complex machine 31a includes a control unit 100a for controlling operations of the respective parts of the machine, the image reading unit 500 including the scanner and the like for reading a document image, an image memory 120 which serves as an area for temporarily storing data of documents read by the image reading unit 500 and temporarily storing data to be printed by the image forming unit 130, and the image forming unit 130 for printing data of documents read by the image reading unit 500, data transmitted from the server SV1 and other data.

The complex machine 31a also includes a facsimile communication unit 140 for implementing various functions necessary for facsimile communication and receiving image data from external facsimile machines via a public line, an operation unit (designation receiver) 20 including a print or transmit start key, a numerical pad and abbreviated number keys and the like and adapted to receive various operation instructions from an operator (print setting input, instruction to print a print setting sheet, etc.) and a display unit (example of notifier) 150 composed of an LCD (Liquid Crystal Display) and the like for displaying operation guidance and the like to the operator. Note that this display unit 150 may receive various operation instructions from the operator by having a touch panel function.

The complex machine 31a further includes a storage unit 170a composed of an HDD (hard disk) or a memory for storing document image data read by the image reading unit 500 and the like. Document image data read by the image reading unit 500, event occurrence arrival timing information received from the other complex machines 32, 33 or the server SV1 by an event occurrence arrival timing information acquirer 11a (hereinafter, written as timing information acquirer 11a) and the like are stored in this storage unit 170a.

The control unit 100a is composed of a CPU and the like and responsible for the overall operation of the complex machine 31a. The control unit 100a includes an elapsed time information calculator 101a, a communicator 102a, the controller 103a, an event occurrence arrival timing information calculator 104a (hereinafter, written as timing information calculator 104a), a difference calculator 105a, a determiner 106a and an event occurrence detector 107a.

The elapsed time information calculator 101a calculates elapsed time information from the first execution of a predetermined operation (e.g. a sheet feeding operation by the pickup roller 2021 that picks up the sheets one by one from the sheet cassette 2011) to a time of executing this operation (e.g. sheet feed number (fed sheet number) by a sheet feeding operation of the pickup roller 2021) when this operation is performed in the complex machine 31a. The elapsed time information calculator 101a stores the calculated elapsed time information in a built-in memory or the storage unit 170a.

The sheet detection sensor 19 outputs an H (high) signal from the light receiving element when light from the light emitting element is received by the light receiving element while outputting an L (low) signal from the light receiving element when no light from the light emitting element can be received by the light receiving element (when light is blocked). These signals are output to the elapsed time information calculator 101a, the timing information calculator 104a and the event occurrence detector 107a.

Figure 4:
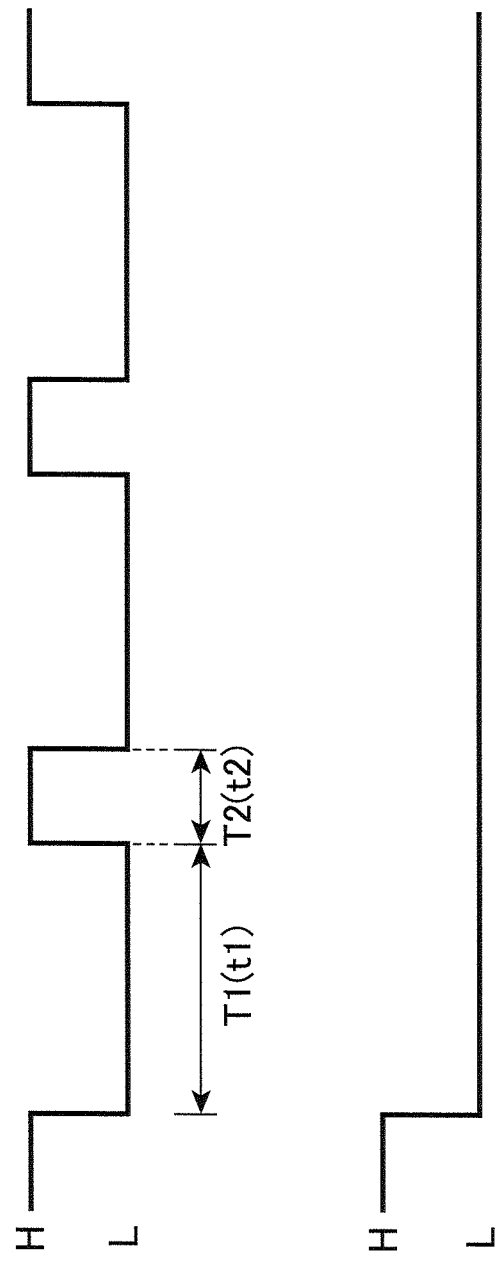
FIGS. 4A and 4B are charts showing detection signals output from a sheet detection sensor.

When there is no jam, recording sheets P are intermittently conveyed from the sheet cassette 201. Thus, as shown in FIG. 4A, an L (low) period T1 (time t1) during which the recording sheet P passes between the light emitting element and the light receiving element and an H (high) period T2 (time t2) between the passage of the recording sheet P between the light emitting element and the light receiving element and the conveyance of the next recording sheet to between the light emitting element and the light receiving element cyclically occur. The time t1 is a value determined according to the length of the sheet P in a conveying direction and a conveying speed of the sheet P. The elapsed time information calculator 101a counts a sheet feed number (fed sheet number) by the pickup roller 2021 by counting the number of the periods T1 indicated by a signal sent from the sheet detection sensor 19.

The communicator 102a performs a process necessary for data transmission and reception to and from the server SV1 and the other complex machines 32, 33. The communicator 102a includes the timing information acquirer 11a and an event occurrence arrival timing information transmitter 12a (hereinafter, written as timing information transmitter 12a).

The timing information acquirer 11a acquires event occurrence arrival timing information (e.g. sheet feed number (fed sheet number) from the first use of the pickup roller 2021 to the occurrence of a sheet jam or the like) indicating elapsed time from the first execution of the predetermined operation (e.g. sheet feeding operation by the pickup roller 2021) to the occurrence of a specific event (e.g. sheet jam at the pickup roller 2021) in the other complex machines 32, 33 network-connected to the complex machine 31a from the other complex machines 32, 33 or the server SV1.

The timing information transmitter 12a transmits the event occurrence arrival timing information calculated by the timing information calculator 104a to the other complex machines 32, 33 or the server SV1.

The timing information calculator 104a calculates event occurrence arrival timing information from the start of a predetermined operation to the occurrence of a specific event in this operation. For example, the timing information calculator 104a calculates, for example, a sheet feed number (fed sheet number) from the start of a sheet feeding operation by the pickup roller 2021 to the occurrence of a sheet jam at the pickup roller 2021 in the sheet feeding operation as the elapsed time information based on a signal output from the sheet detection sensor 19 similar to the elapsed time information calculator 101a and, when receiving a signal indicating the occurrence of a jam (L (low) signal of a period exceeding the time t1) from the sheet detection sensor 19, calculates elapsed time information at this time as the event occurrence arrival timing information. The timing information calculator 104a stores the calculated event occurrence arrival timing information in a built-in memory or the storage unit 170a.

The event occurrence detector 107a detects the occurrence of a specific event in a predetermined operation in the complex machine 31a. Since a recording sheet P stays between the light emitting element and the light receiving element of the sheet detection sensor 19 for a time equal to or longer than the time t1 when a jam occurs, an L (low) signal of a period exceeding the time t1 is output from the light receiving element to the event occurrence detector 107a. For example, the event occurrence detector 107a judges that there is no jam when receiving a signal which rises from L to H after the time t1 following a fall timing from H to L (FIG. 4A) and judges that a jam has occurred when receiving a signal which does not rise from L to H even after the elapse of the time t1 following a fall timing from H to L (FIG. 4B) based on the signal output from the sheet detection sensor 19.

The difference calculator 105a calculates a difference between the elapsed time information calculated by the elapsed time information calculator 101a and the event occurrence arrival timing information from the other complex machines 32, 33 or the server SV1 acquired by the timing information acquirer 11a.

The determiner 106a stores a predetermined limit value L (e.g. a value which is 10% of the sheet feed number in the event of a sheet jam indicated by the event occurrence arrival timing information in the case of the sheet feed number from the start of the sheet feeding operation to the occurrence of the sheet jam at the pickup roller 2021), and determines whether or not the difference calculated by the difference calculator 105a has reached this limit value L.

The controller 103a is responsible for operation controls in the entire complex machine 31a. For example, the controller 103a causes the respective operating mechanisms of the complex machine 31a to perform a printing operation, a copying operation and the like.

The complex machine 31a further includes an image processing unit 190 for performing processes of editing/processing image data read by the image reading unit 500 (coding/decoding processes, size enlargement/reduction processes, compression/expansion processes), and a network I/F 160 used for transfer of various data to and from the server SV1 and the complex machines 32, 33.

The sheet feeding operation by the pickup roller 2021 as the predetermined operation and the sheet jam at the pickup roller 2021 as the specific event are merely examples of the predetermined operation and the specific event, and the predetermined operation and the specific event are not limited to these. Combinations of a predetermined operation—a specific event—elapsed time information—event occurrence arrival timing information described below or another combination may be adopted. For example, (a) feeding operation by the feed roller 602 of the document feeding unit 600—document image reading error in the image reading unit 500 (determined by a known document image reading error determination)—feed number from the start of the feeding operation by the feed roller 602 (feed number is counted by a sheet detection sensor as in the case of the pickup roller 2021)—feed number at the time of a document image reading error; and (b) image forming operation by the image forming unit 130—toner empty detection in the developing device 207 (detection by a known detection method using a toner remainder detection sensor)—image forming number by the image forming unit 130 (e.g. using sheet feed number from the sheet cassette 2011 counted by the sheet detection sensor 19 as in the case of the pickup roller 2021)—image forming number in the image forming unit 130 at the time of detecting no more toner in the developing device 207. The same holds true for a second embodiment concerning the predetermined operation and the specific event described above.

Figure 5:
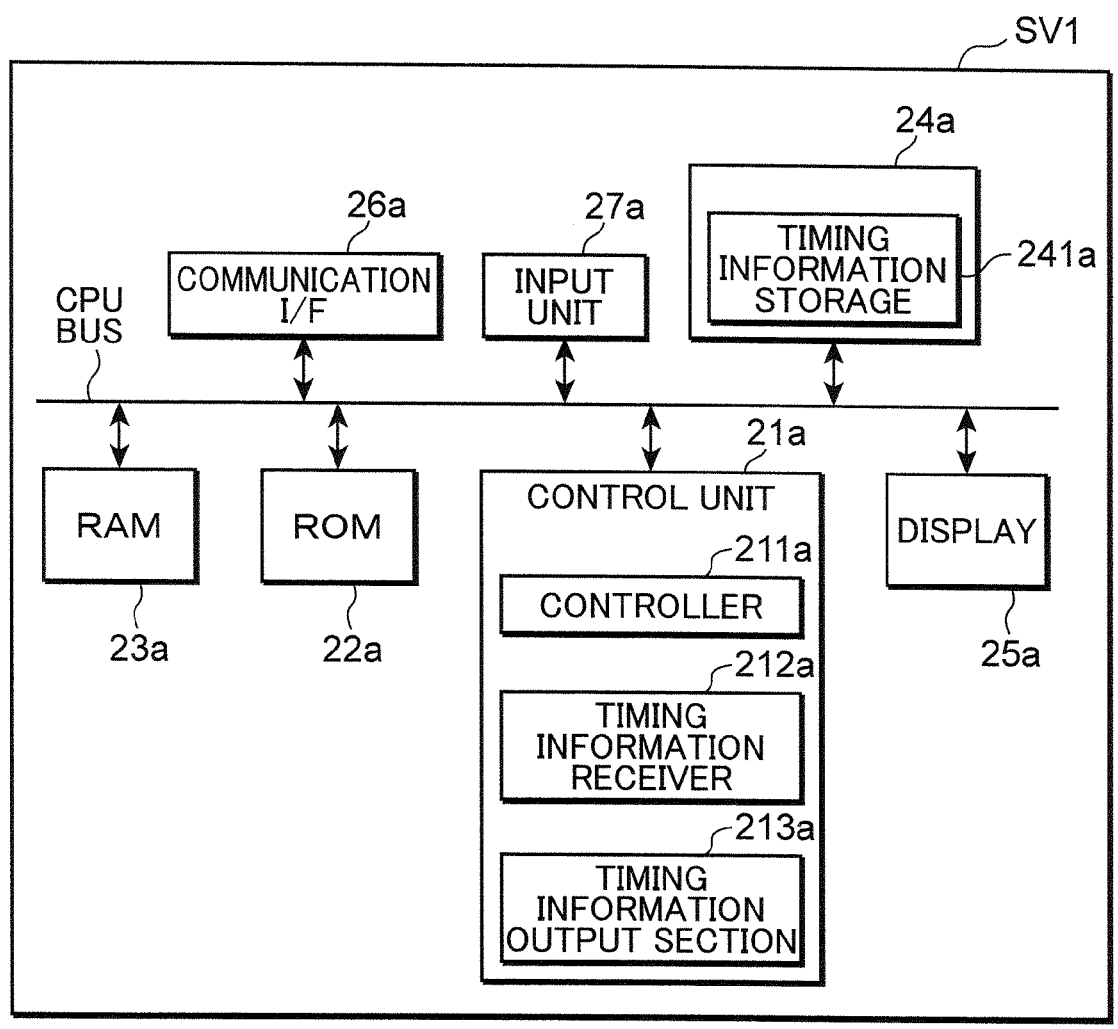
FIG. 5 is a block diagram schematically showing the internal construction of the server according to the first embodiment.

FIG. 5 is a block diagram schematically showing the internal construction of the server SV1. The server SV1 includes a control unit 21a, a ROM 22a, a RAM 23a, a storage unit 24a, a display 25a, a communication I/F 26a and an input unit 27a. These parts are capable of transmitting and receiving data or signals to and from each other via a CPU bus.

The control unit 21a is composed of a CPU and the like and responsible for operation controls of the entire server SV1. The ROM 22a stores an operation program on respective operations of the server SV1. The RAM 23a is used as an operation area and the like of a controller 211a.

The storage unit 24a is composed of an HDD and the like and a part of a storage area thereof functions as an event occurrence arrival timing information storage 241a (hereinafter, written as timing information storage 241a) for storing event occurrence arrival timing information received from the complex machines 31a, 32 and 33 by an event occurrence arrival timing information receiver 212a (hereinafter, written as timing information receiver 212a).

The display 25a is composed of an LCD (Liquid Crystal Display) and the like and displays contents of various data, operation guidance for a user who operates the server SV1 and the like. The communication I/F 26a functions as an interface for data communication between the server SV1 and the complex machines 31a, 32 and 33. The input unit 27a includes a keyboard, a mouse and the like and jobs to the server SV1 are entered by the user.

The control unit 21a is composed of a CPU and the like and includes the controller 211a, the timing information receiver 212a and an event occurrence arrival timing information output section 213a (hereinafter, written as timing information output section 213a).

The controller 211a is responsible for operation controls of the entire server SV1.

The timing information receiver 212a receives the event occurrence arrival timing information transmitted from the timing information transmitter 12a of the complex machine 31a.

The timing information output section 213a outputs the event occurrence arrival timing information stored in the timing information storage 241a to the complex machine 31a requesting the transmission of this event occurrence arrival timing information.

Figure 6:
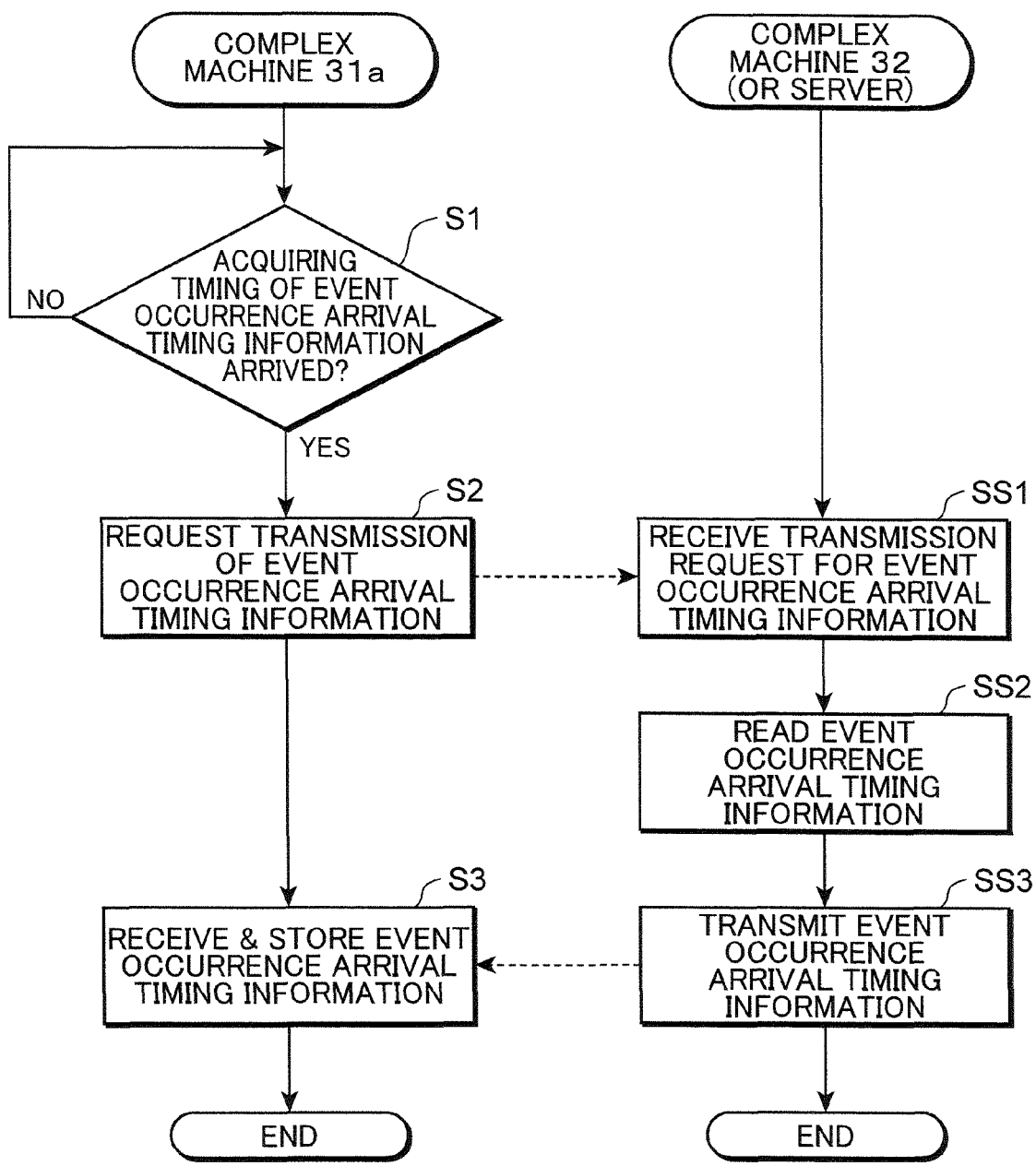
FIG. 6 is a flow chart showing a process of transmitting and receiving event occurrence arrival timing information by the image forming system according to the first embodiment.

Next, a process of transmitting and receiving the event occurrence arrival timing information by the image forming system 10 is described. FIG. 6 is a flow chart showing the process of transmitting and receiving the event occurrence arrival timing information by the image forming system 10.

In the complex machine 31a, the timing information acquirer 11a judges whether or not a predetermined timing as a timing of acquiring the event occurrence arrival timing information has arrived (S1). Judgment on the arrival of the predetermined timing is, for example, made in any one of the following manners. (1) The predetermined timing is stored in a built-in memory and the timing information acquirer 11a makes the above judgment based on whether or not the arrival of this timing has been measured by a built-in timer. (2) The operation unit 20 receives designation of the predetermined timing (e.g. every 20 minutes, every time a main power switch of the complex machine 31a is turned on, etc.) from a user through an operation of the user and the timing information acquirer 11a makes the above judgment based on whether or not the arrival of the timing designated by the user has been measured by the built-in timer. (3) The timing information acquirer 11a receives a detection signal indicating the occurrence of a specific event in the predetermined operation from the event occurrence detector 107a when the occurrence of this event is detected by the event occurrence detector 107a, and judges a timing of receiving this detection signal as the arrival of the predetermined timing. (4) The operation unit 20 receives designation of the predetermined operation and a possible specific event in this operation (e.g. the predetermined operation is a sheet feeding operation by the pickup roller 2021 and the specific event is a sheet jam at the pickup roller 2021, etc.) from a user through an operation of the user and, when the designated operation and the occurrence of the specific event are detected by the event occurrence detector 107a, the timing information acquirer 11a receives a detection signal indicating this occurrence from the event occurrence detector 107a and judges a timing of receiving this detection signal as the arrival of the predetermined timing.

When detecting the arrival of the acquiring timing (YES in S1), the timing information acquirer 11a sends a transmission request signal requesting transmission of the event occurrence arrival timing information accumulated in the complex machines 32, to all the other network-connected complex machines 32, 33 constituting the image forming system 10 (S2).

When the timing information transmitter 12a receives a request instruction signal from the complex machine 31a (SS1), each of all the other complex machines 32, 33 in the image forming system 10 reads the event occurrence arrival timing information stored in the storage unit (corresponding to the storage unit 170a) of the complex machine 32, 33 (SS2) and transmits the read event occurrence arrival timing information to the complex machine 31a having transmitted the transmission request signal (SS3).

Here, the request and transmission of the event occurrence arrival timing information may be carried out as follows. (1) The complex machine 31a that transmits the above transmission request signal may include information on the type of the event occurrence arrival timing information requested to be transmitted (e.g. if the timing information acquirer 11a transmits the transmission request to the other complex machines 32, 33 at a timing when the event occurrence detector 107a detects a sheet jam (the specific event) in the sheet feeding operation (the predetermined operation) by the pickup roller 2021, this type is the sheet jam (the specific event) in the sheet feeding operation (the predetermined operation), etc.) in the transmission request signal and each of all the other complex machines 32, 33 having received the transmission request may read the event occurrence arrival timing information of the type indicated by this transmission request from the storage unit and transmit it to the complex machine 31a having transmitted the transmission request signal. In this case, if the transmission request signal defines, for example, the sheet feeding operation by the pickup roller 2021 as the predetermined operation, all the other complex machines 32, 33 having received the transmission request preferably transmit the event occurrence arrival timing information on the occurrence of sheet jams not at the pickup rollers 2022 to 2024, but at the pickup roller 2021 to the complex machines 31a having transmitted the above transmission request signal. This is to improve accuracy in detecting the occurrence of a sheet jam at the pickup roller 2021 by transmitting and receiving the event occurrence arrival timing information on the same pickup roller 2021 (i.e. the same operating mechanism) between the respective complex machines.

Alternatively, (2) the complex machine 31a that transmits the transmission request signal may not specify type information of the event occurrence arrival timing information requested to be transmitted in the transmission request signal and each of all the complex machines 32, 33 having received the transmission request may read all the pieces of event occurrence arrival timing information stored in the storage unit of the complex machine 32, 33 and transmit them to the complex machine 31a having transmitted the transmission request signal.

The timing information acquirer 11a of the complex machine 31a having transmitted the transmission request signal receives the event occurrence arrival timing information transmitted from the other complex machines 32, 33 and stores it in the storage unit 170a (S3).

In this embodiment, after the event occurrence arrival timing information is calculated in the complex machines 31a, 32 and 33, the respective complex machines 31a, 32 and 33 transmit the event occurrence arrival timing information to the other complex machine having transmitted the transmission request. However, the process of transmitting and receiving the event occurrence arrival timing information by the image forming system 10 is not limited to this.

For example, after the event occurrence arrival timing information is calculated in the complex machines 31a, 32 and 33, the respective complex machines 31a, 32 and 33 may transmit the event occurrence arrival timing information to the server SV1 and the server SV1 may receive and store this event occurrence arrival timing information and individually transmit the event occurrence arrival timing information to the complex machine having transmitted a transmission request as in the processings in SS1 to SS3 described above.

Figure 7:
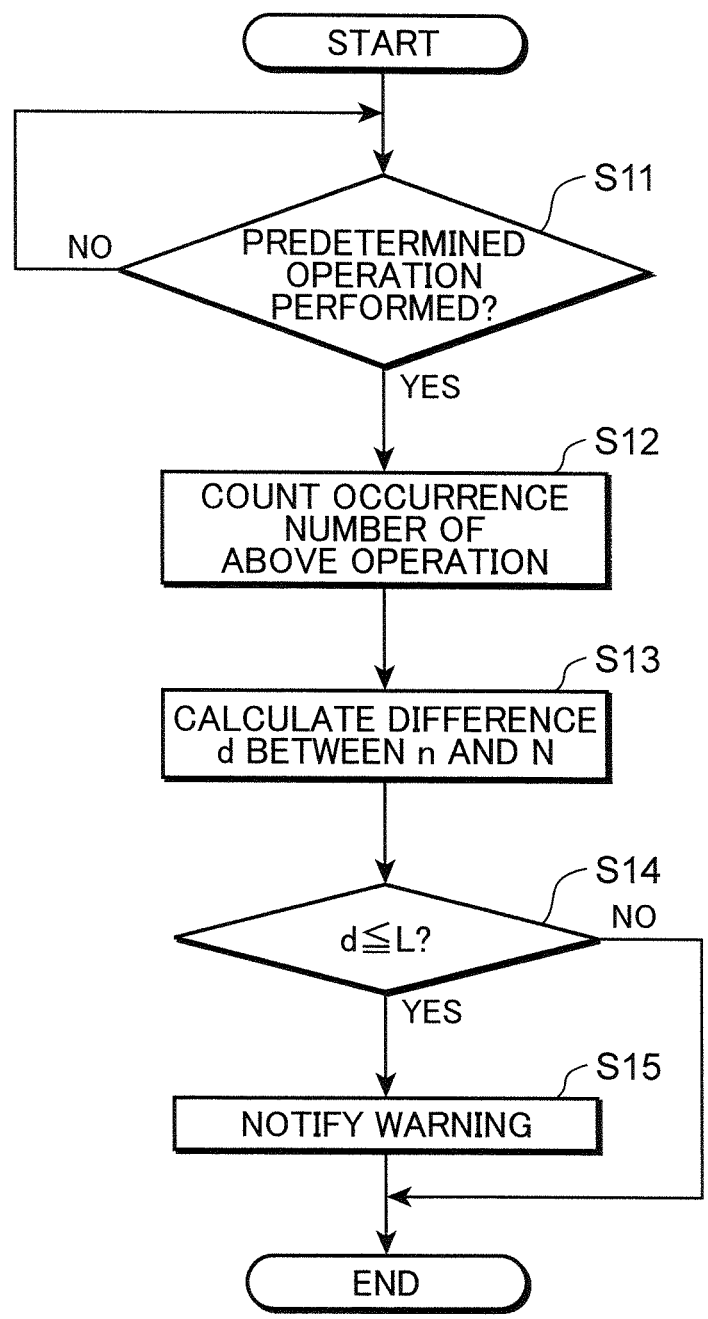
FIG. 7 is a flow chart showing a warning process in the complex machine according to the first embodiment.

Next, a warning process in the complex machine 31a is described. FIG. 7 is a flow chart showing the warning process in the complex machine 31a.

When the event occurrence detector 107a detects a specific event in a predetermined operation, e.g. a sheet jam at the pickup roller 2021 (YES in S11), the elapsed time information calculator 101a counts an occurrence number of the event to be detected (here, sheet jam at the pickup roller 2021) as elapsed time information by a built-in counter every time the detection is made (S12).

The difference calculator 105a calculates a difference d between the occurrence number (count value) n of the above event as the elapsed time information after the counting in S12 and an occurrence timing arrival number N indicated by the event occurrence arrival timing information acquired by the timing information acquirer 11a and stored in the storage unit 170a and indicating a predetermined operation and a specific event similar to the specific event in the predetermined operation, the occurrence of which was detected in S11 (S13).

The controller 103a judges whether or not the difference d is equal to or below the limit value L retained beforehand (whether or not the difference d has reached the limit value L) (S14). If the difference d is judged to be equal to or below the limit value L (YES in S14), the controller 103a causes the display unit 150 to display a warning message indicating that the predetermined event (sheet jam at the pickup roller 2021 in this example) may occur in the predetermined operation (sheet feeding operation by the pickup roller 2021 in this example) (S15).

The control executed by the controller 103a when the difference d is judged to be equal to or below the limit value L is not limited to the warning display operation by the display unit 150, and may be another operation by another operating mechanism.

Figure 8:
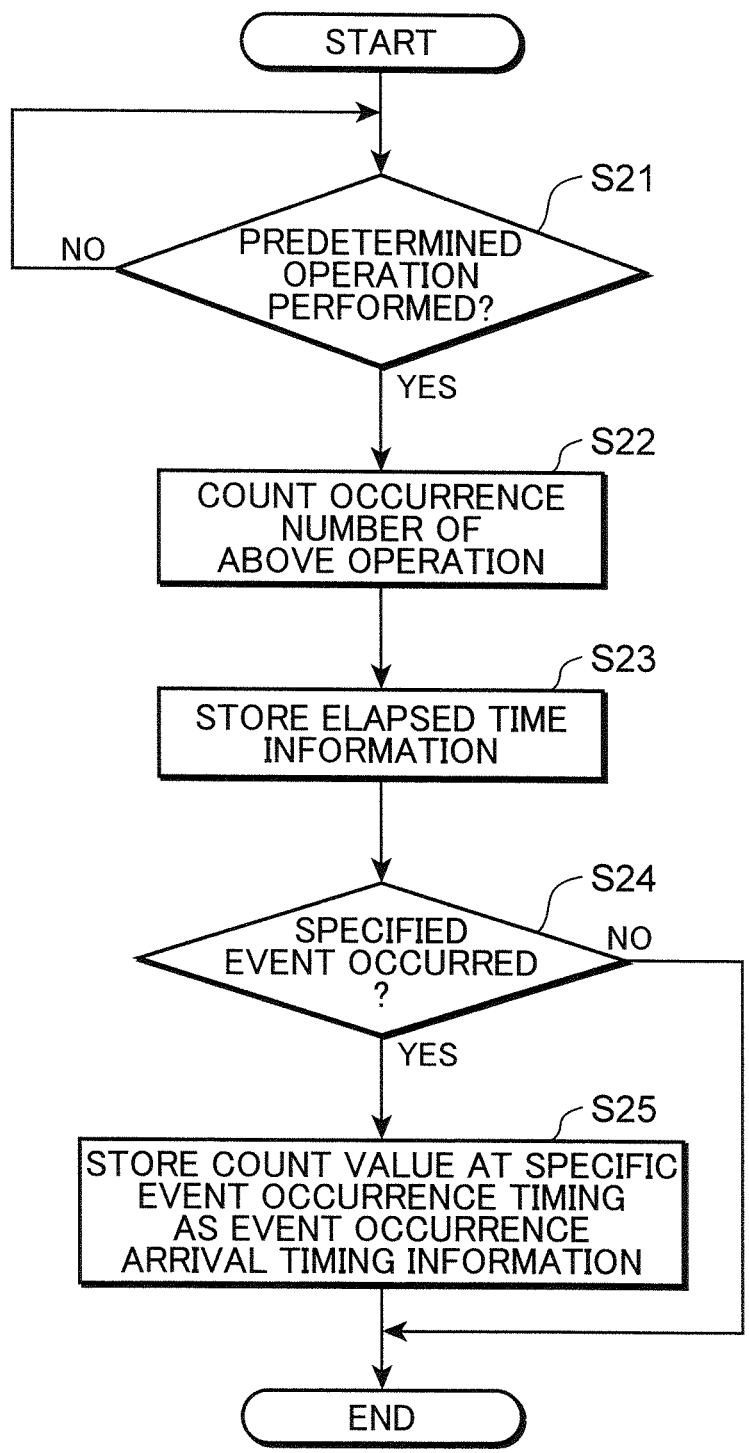
FIG. 8 is a flow chart showing a first example of a process of storing the event occurrence arrival timing information in the complex machine according to the first embodiment.

Next, a first example of a process of storing the event occurrence arrival timing information in the complex machine 31a is described. FIG. 8 is a flow chart showing this first example.

Every time the controller 103a causes the operating mechanism (pickup roller 2021 in this example) to perform the predetermined operation (sheet feeding operation by the pickup roller 2021 in this example) (YES in S21), the elapsed time information calculator 101a and the timing information calculator 104a count up an execution number of the predetermined operation by built-in counters (S22). For example, the elapsed time information calculator 101a and the timing information calculator 104a count the sheet feed number (fed sheet number) by the pickup roller 2021 by counting the number of the periods T1 indicated by a signal sent from the sheet detection sensor 19 as described above. The elapsed time information calculator 101a stores the calculated elapsed time information, e.g. the sheet feed number of the pickup roller 2021 in the built-in memory or the storage unit 170a (S23).

When the occurrence of the specific event (sheet jam at the pickup roller 2021 in this example) is detected by the event occurrence detector 107a (YES in S24), the timing information calculator 104a stores the count value of the above counter at this detection timing as the event occurrence arrival timing information in the built-in memory or the storage unit 170a (S25). Thereafter, the process shown in FIG. 6 is performed among the complex machines 31a, 32 and 33. Note that the processing in S25 is not performed if the occurrence of the specific event is not detected by the event occurrence detector 107a (NO in S24).

Figure 9:
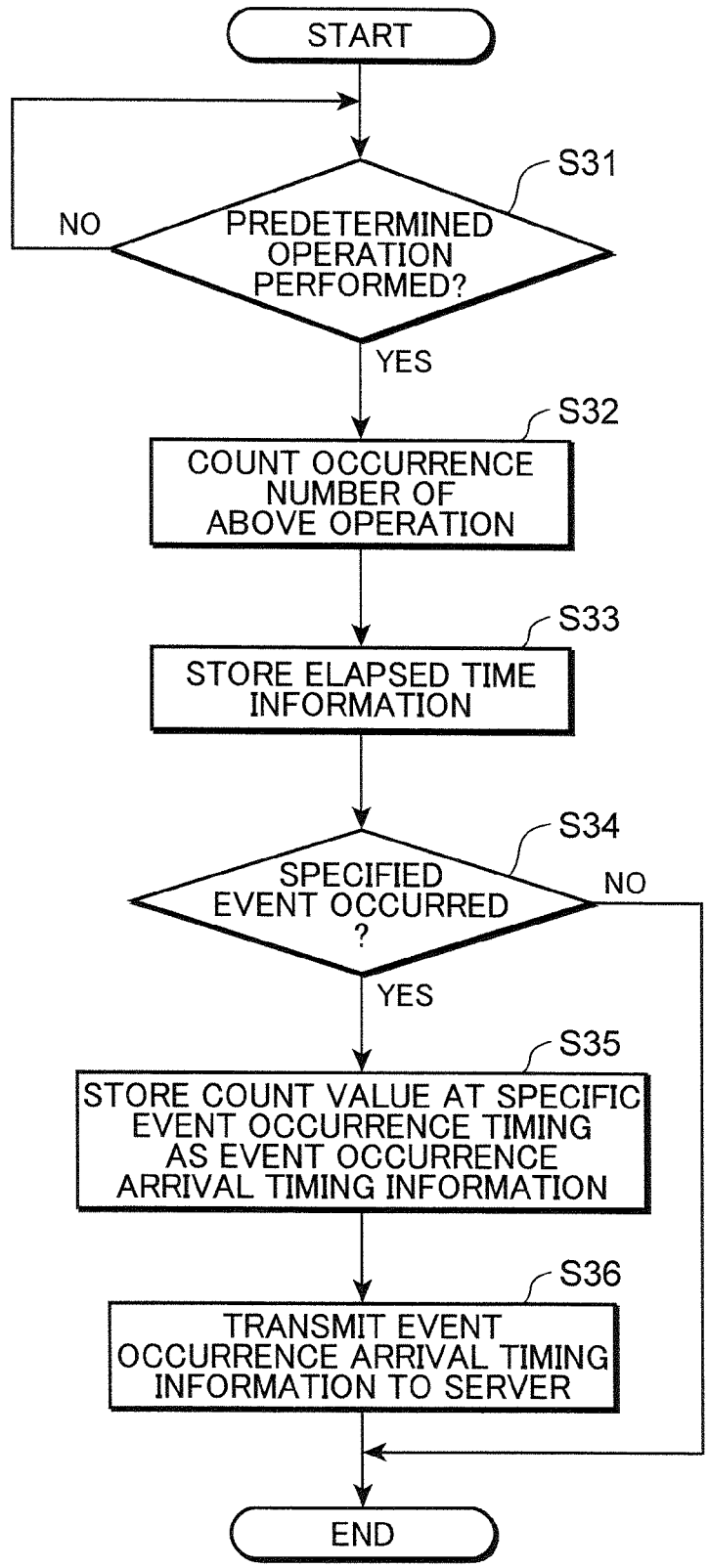
FIG. 9 is a flow chart showing a second example of the process of storing the event occurrence arrival timing information in the complex machine according to the first embodiment.

Next, a second example of the process of storing the event occurrence arrival timing information in the complex machine 31a is described. FIG. 9 is a flow chart showing this second example. In this second example, after calculating the event occurrence arrival timing information, the respective complex machines 31a, 32 and 33 transmit this event occurrence arrival timing information to the server SV1 and the server SV1 receives and stores this event occurrence arrival timing information and individually transmits this event occurrence arrival timing information to any one of the complex machines 31a, 32 33 having transmitted a transmission request. Note that processings similar to those of the first example are not described.

After the timing information calculator 104a stores the count value of the above counter at a detection timing as the event occurrence arrival timing information in the built-in memory or the storage unit 170a (S35), the timing information transmitter 12a transmits this event occurrence arrival timing information to the server SV1 (S36).

The server SV1 having received this event occurrence arrival timing information stores it in the timing information storage 241a. Then, when receiving a transmission request for the event occurrence arrival timing information from any one of the complex machines 31a, 32 and 33, the server SV1 transmits the event occurrence arrival timing information to any one of the complex machines 31a, 32 and 33 having transmitted this transmission request as in the processings in SS1 to SS3 shown in FIG. 6.

The same holds true for the second embodiment concerning the first and second examples described above.

Note that the present invention is not limited to the construction of the above embodiment and various modifications are possible. The same holds true for the second embodiment. For example, the image forming system 10 according to the present invention is composed of a plurality of complex machines and the server SV1 is not necessary if the event occurrence arrival timing information is transmitted and received among the complex machines 31a, 32 and 33 shown in the above embodiment and the above determination is made by the determiner 106a in each complex machine. Further, if the event occurrence arrival timing information transmitted from the complex machines 31a, 32 and 33 shown in the above embodiment is stored in the server SV1, the server SV1 is a necessary constituent of the image forming system 10.

The image forming system 10 may be composed of the complex machines 31a, 32 and 33 without including the server SV1, any one of the complex machines 31a, 32 and 33 performs the processings in S1 to S3 shown in FIG. 6 and processings similar to those performed by the server SV1 in the case of the image forming system 10 including the server SV1. In this case, the respective complex machines transmit a transmission request for the event occurrence arrival timing information to the complex machine in charge of the processings similar to the server SV1 when acquiring the event occurrence arrival timing information.

Main effects of the first embodiment are described.

According to the first embodiment, the event occurrence arrival timing acquirer 11a acquires the event occurrence arrival timing information until a specific event in the predetermined operation occurs in the other image forming apparatuses (complex machines 32, 33) from the other image forming apparatuses or the server (server SV1), the difference calculator 105a calculates a difference between elapsed time information indicating elapsed time which is calculated by the elapsed time information calculator and during which the predetermined operation is performed in the image forming apparatus (complex machine 31a) and the event occurrence arrival timing information acquired by the event occurrence arrival timing acquirer 11a, and the controller 103a causes a predetermined operating mechanism to perform a corresponding operation predetermined as a measure against the specific event when the difference is determined to have reached a predetermined limit value by the determiner 106a.

In this way, each image forming apparatus of the invention can calculate approach to an occurrence timing of the specific event concerning the predetermined operation in the image forming apparatus based on the occurrence timing of this event in the predetermined operation in other image forming apparatuses, and can perform a corresponding operation to deal with this event in the image forming apparatus before this event actually occurs concerning this operation.

According to the first embodiment, approach to an occurrence timing of the specific event concerning the predetermined operation in the image forming apparatus according to the first embodiment is calculated based on the occurrence timing of the specific event concerning the predetermined operation in the other image forming apparatuses, and the controller 103a causes a notifier to notify a warning before the event actually occurs concerning this operation. This enables a user to recognize approach to an occurrence timing of this event concerning this operation in the own image forming apparatus.

Since the event occurrence arrival timing information acquirer 11a acquires the elapsed time information from the other image forming apparatuses or the server every predetermined period of time according to the first embodiment, approach to an occurrence timing of the event concerning the operation can be calculated as needed every predetermined period of time in the image forming apparatus according to the first embodiment.

According to the first embodiment, the event occurrence arrival timing information acquirer 11a acquires the event occurrence arrival timing information from the other image forming apparatuses or the server when the event occurrence detector 107a detects the occurrence of a specific event in the predetermined operation in the image forming apparatus according to the first embodiment. Thus, the event occurrence arrival timing information in the other image forming apparatuses can be acquired when it is necessary to calculate approach to an occurrence timing of this event concerning this operation in the image forming apparatus.

According to the first embodiment, the event occurrence arrival timing information acquirer 11a acquires event occurrence arrival timing information on an operation and an event designated by a user from the other image forming apparatuses or the server when the designated event occurs concerning the designated operation. Thus, approach to an occurrence timing of an event can be calculated for an operation and an event desired by the user.

Since the event occurrence arrival timing information acquirer 11a acquires the elapsed time information from the other image forming apparatuses or the server at a timing designated by the user according to the first embodiment, approach to an occurrence timing of the event concerning the operation can be calculated at the timing desired by the user in the image forming apparatus according to the first embodiment.

Since the event occurrence arrival timing information transmitter 12a transmits the event occurrence arrival timing information calculated by the event occurrence arrival timing information calculator 104a to the other image forming apparatuses or the server according to the first embodiment, the image forming apparatus according to the first embodiment can provide the event occurrence arrival timing information on a specific event having occurred concerning a predetermined operation in the image forming apparatus to the other image forming apparatuses to enable the other image forming apparatuses to calculate an occurrence timing of the above event in the other image forming apparatuses.

Second Embodiment

Figure 10:
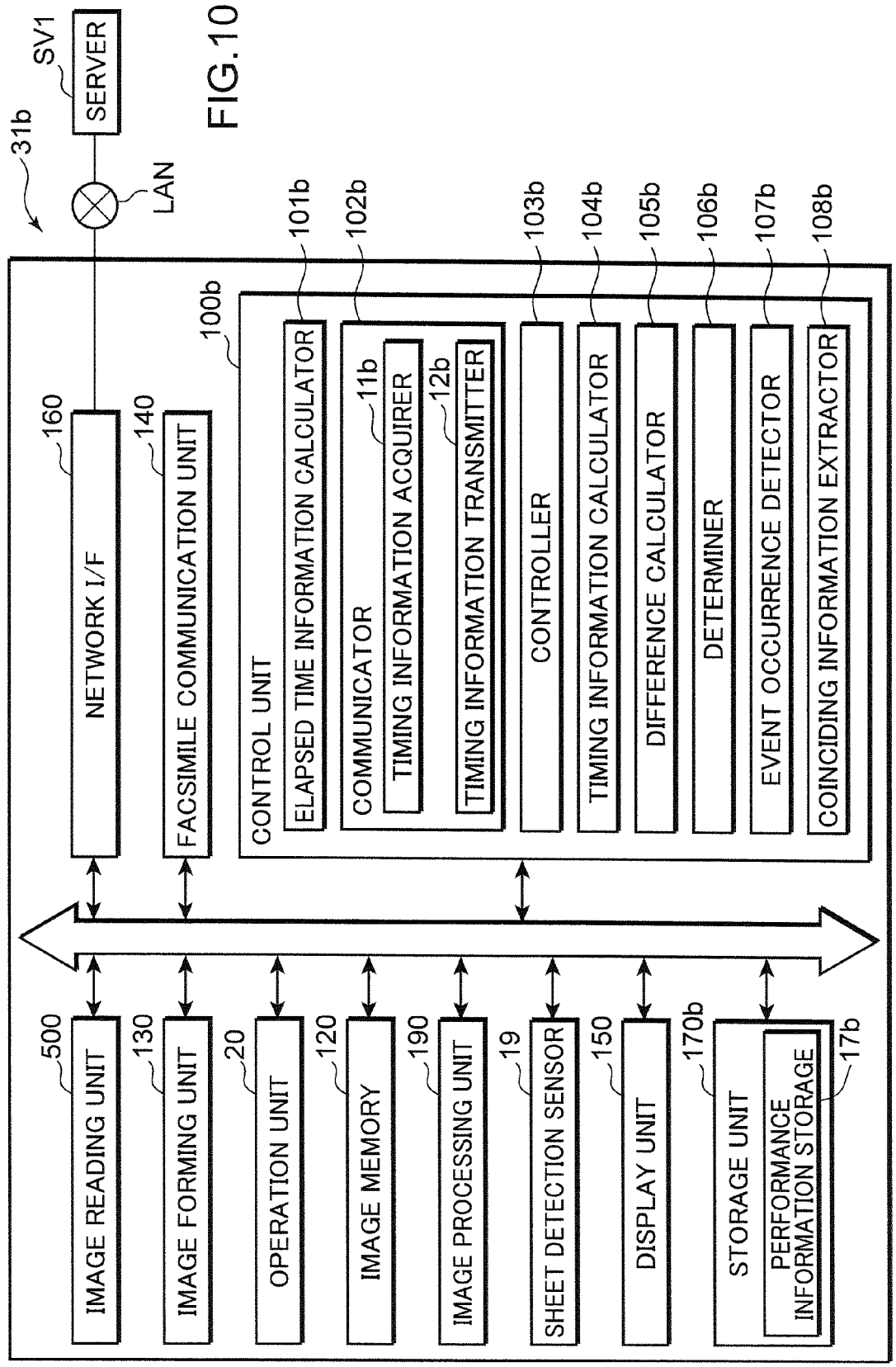
FIG. 10 is a block diagram schematically showing the internal construction of a complex machine according to a second embodiment.

A second embodiment of an image forming apparatus and an image forming system according to the present invention is described. FIG. 10 is a block diagram schematically showing the internal construction of a complex machine 31b according to the second embodiment. A diagram showing a network configuration of the image forming system according to the second embodiment is the same as the diagram of FIG. 1 showing the network configuration of the image forming system 10 according to the first embodiment, and a sectional view showing a schematic construction of the complex machine 31b according to the second embodiment is the same as the sectional view of FIG. 2 showing the schematic construction of the complex machine 31a according to the first embodiment. Thus, these diagrams are neither shown nor described.

In the complex machine 31b according to the second embodiment shown in FIG. 10, blocks other than a storage unit 170b and a control unit 100b are the same as the blocks other than the storage unit 170a and the control unit 100a of the complex machine 31a according to the first embodiment shown in FIG. 3. Thus, these blocks are not described by being identified by the same reference numerals. A timing information acquirer 11b described below constitutes an example of the acquirer, and a performance information storage 17b, a coinciding information extractor 108b, a difference calculator 105b, a determiner 106b and a controller 103b constitute an example of the processor.

The complex machine 31b further includes the storage unit 170b composed of an HDD (hard disk) or a memory for storing document image data read by an image reading unit 500 and the like. Document image data read by the image reading unit 500, event occurrence arrival timing information received from other complex machines 32, 33 or a server SV1 by the event occurrence arrival timing information acquirer 11b (hereinafter, written as time information acquirer 11b) and the like are stored in this storage unit 170b.

A partial area of the storage unit 170b functions as the performance information storage 17b storing one or a plurality of pieces of performance information indicating performance(s) of the complex machine 31b. Note that this performance information is machine type information indicating the type of the complex machine 31b, function information indicating functions possessed by the complex machine 31b, narrow performance information indicating details of the respective performances possessed by the complex machine 31b or the like.

An example of the above function information is color/monochromatic information indicating whether or not the complex machine 31b is capable of forming a color image (can form only a monochromatic image). Further, an example of the narrow performance information is image forming speed information indicating an image forming speed (the number of images formed per minute). In the complex machines 31b, 32 and 33 constituting the image forming system, the predetermined information out of the type information, the function information and the narrow performance information is commonly stored as the performance information in the respective performance information storages 17b.

Note that the performance information is not limited to the above type information, function information and narrow performance information and it is also possible to use other information indicating performances and characteristics of the complex machine.

The control unit 100b is composed of a CPU and the like and responsible for the overall operation of the complex machine 31b. The control unit 100b includes an elapsed time information calculator 101b, a communicator 102b, the controller 103b, a timing information calculator 104b, the difference calculator 105b, the coinciding information extractor 108b, the determiner 106b and an event occurrence detector 107b.

When a predetermined operation (e.g. sheet feeding operation by a pickup roller 2021 that picks up sheets one by one from a sheet cassette 2011) is performed in the complex machine 31b, the elapsed time information calculator 101b calculates elapsed time information (sheet feed number (fed sheet number) by the sheet feeding operation at the pickup roller 2021) from the first execution of the operation to the time of executing the operation. The elapsed time information calculator 101b stores the calculated elapsed time information in a built-in memory or the storage unit 170b.

A sheet detection sensor 19 outputs an H (high) signal from a light receiving element when light from a light emitting element is received by the light receiving element while outputting an L (low) signal from the light receiving element when no light from the light emitting element can be received by the light receiving element (when light is blocked). These signals are output to the elapsed time information calculator 101b, the timing information calculator 104b and the event occurrence detector 107b.

When there is no jam, recording sheets P are intermittently conveyed from a sheet cassette 2011. Thus, as shown in FIG. 4A, an L (low) period T1 (time t1) during which the recording sheet P passes between the light emitting element and the light receiving element and an H (high) period T2 (time t2) between the passage of the recording sheet P between the light emitting element and the light receiving element and the conveyance of the next recording sheet to between the light emitting element and the light receiving element cyclically occur. The time t1 is a value determined according to the length of the sheet P in a conveying direction and a conveying speed of the sheet P. The elapsed time information calculator 101b counts the sheet feed number (fed sheet number) by the pickup roller 2021 by counting the number of the periods T1 indicated by a signal sent from the sheet detection sensor 19.

The communicator 102b performs a process necessary for data transmission and reception to and from the server SV1 and the other complex machines 32, 33. The communicator 102b includes the timing information acquirer 11b and an event occurrence arrival timing information transmitter 12b (hereinafter, written as timing information transmitter 12b).

The timing information acquirer 11b acquires event occurrence arrival timing information including elapse information (e.g. sheet feed number (fed sheet number) from the start of using the pickup roller 2021 to the occurrence of a sheet jam, etc.) indicating elapsed time from the first execution of the predetermined operation (e.g. sheet feeding operation by the pickup roller 2021) to the occurrence of a specific event (e.g. sheet jam at the pickup roller 2021) in the other complex machines 32, 33 network-connected to the complex machine 31a and performance information indicating performances of the other complex machines 32, 33 from the other complex machines 32, 33 or the server SV1.

The timing information transmitter 12b transmits the information calculated by the timing information calculator 104b and the event occurrence arrival timing information including the performance information stored in the performance information storage 17b to the other complex machines 32, 33 or the server SV1.

The timing information calculator 104b calculates information from the start of a predetermined operation to the occurrence of a specific event in this operation. For example, the timing information calculator 104b calculates a sheet feed number (fed sheet number) from the start of a sheet feeding operation by the pickup roller 2021 to the occurrence of a sheet jam at the pickup roller 2021 in this operation as the elapsed time information based on a signal output from the sheet detection sensor 19 similar to the elapsed time information calculator 101b and, when receiving a signal indicating the occurrence of a jam (L (low) signal of a period exceeding the time t1) from the sheet detection sensor 19, calculates elapsed time information at this time as the above information. The timing information calculator 104b stores the calculated event occurrence arrival timing information in a built-in memory or the storage unit 170b.

The event occurrence detector 107b detects the occurrence of a specific event in a predetermined operation in the complex machine 31b. Since a recording sheet P stays between the light emitting element and the light receiving element of the sheet detection sensor 19 for a time equal to or longer than the time t1 when a jam occurs, an L (low) signal of a period exceeding the time t1 is output from the light receiving element to the event occurrence detector 107b. For example, the event occurrence detector 107b judges that there is no jam when receiving a signal which rises from L to H after the time t1 following a fall timing from H to L (FIG. 4A) and judges that a jam has occurred when receiving a signal which does not rise from L to H even after the elapse of the time t1 following a fall timing from H to L (FIG. 4B) based on the signal output from the sheet detection sensor 19.

When the timing information acquirer 11b acquires the event occurrence arrival timing information, the coinciding information extractor 108b extracts the acquired event occurrence arrival timing information including the performance information coinciding with the performance information stored in the performance information storage 17b.

The difference calculator 105b calculates a difference between the elapsed time information calculated by the elapsed time information calculator 101b and the elapse information of the event occurrence arrival timing information from the other complex machines 32, 33 or the server SV1 acquired by the timing information acquirer 11b.

The determiner 106b determines whether or not the difference calculated by the difference calculator 105b is equal to or below a predetermined limit value L (e.g. value which is 10% of the sheet feed number at the time of a sheet jam indicated by the event occurrence arrival timing information in the case of the sheet feed number from the start of the sheet feeding operation to the occurrence of the sheet jam at the pickup roller 2021).

The controller 103b is responsible for operation controls in the entire complex machine 31b. For example, the controller 103b causes the respective operating mechanisms of the complex machine 31b to perform a printing operation, a copying operation and the like.

Since a block diagram schematically showing the internal construction of the server SV1 according to the second embodiment is the same as the block diagram of FIG. 5 schematically showing the internal construction of the server SV1 according to the first embodiment, this diagram is neither shown nor described.

Figure 11:
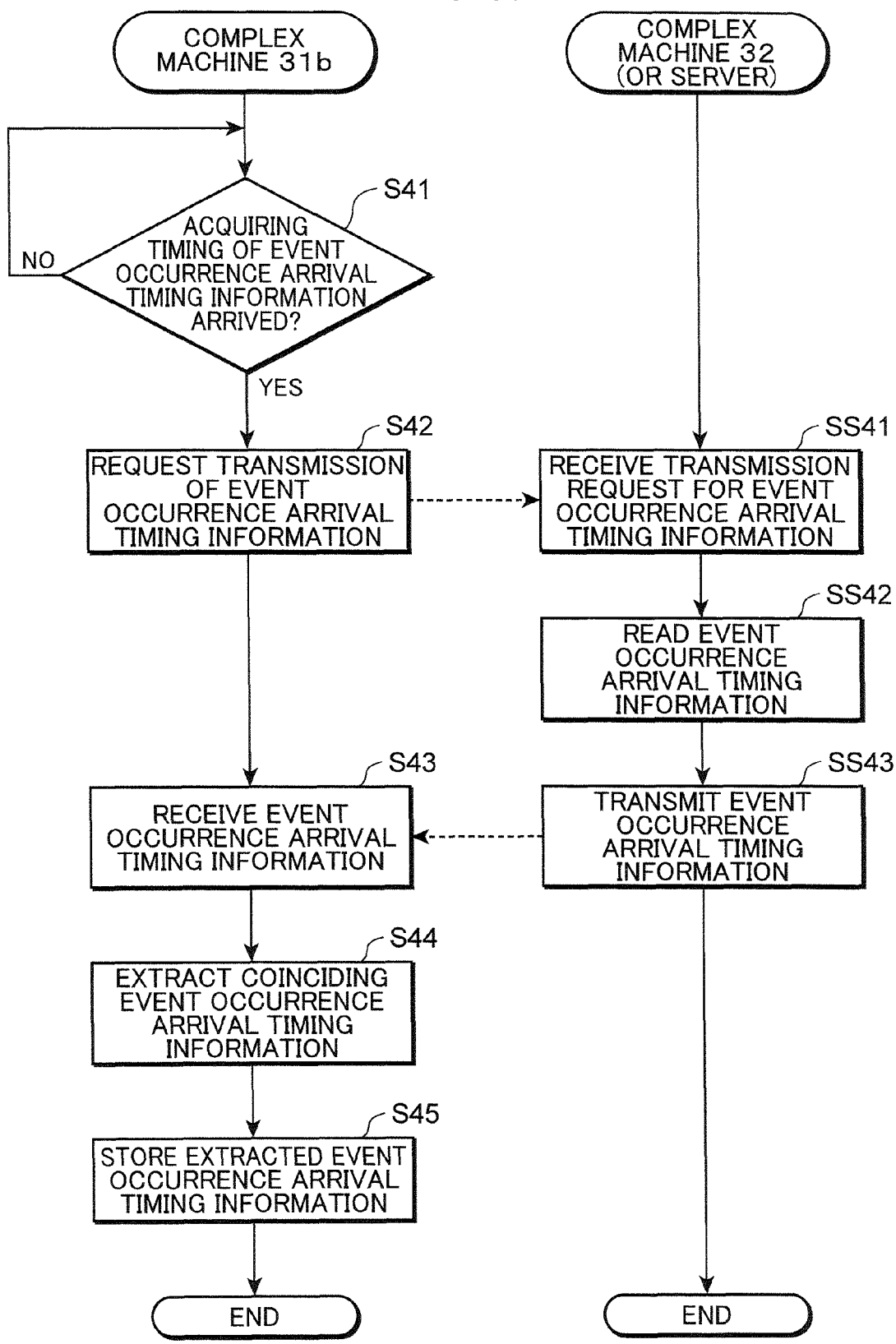
FIG. 11 is a flow chart showing a process of transmitting and receiving event occurrence arrival timing information by an image forming system according to the second embodiment.

Next, a process of transmitting and receiving the event occurrence arrival timing information by the image forming system 10 according to the second embodiment is described. FIG. 11 is a flow chart showing this transmitting and receiving process.

In the complex machine 31b, the timing information acquirer 11b judges whether or not a predetermined timing as a timing of acquiring the event occurrence arrival timing information has arrived (S41). Judgment on the arrival of the predetermined timing is, for example, made in any one of the following manners. (1) The predetermined timing is stored in a built-in memory of the timing information acquirer 11b and the timing information acquirer 11b makes the above judgment based on whether or not the arrival of this timing has been measured by a built-in timer. (2) An operation unit 20 receives designation of the predetermined timing (e.g. every 20 minutes, every time a main power switch of the complex machine 31b is turned on, etc.) from a user through an operation of the user and the timing information acquirer 11b makes the above judgment based on whether or not the arrival of the timing designated by the user has been measured by the built-in timer. (3) The timing information acquirer 11b receives a detection signal indicating the occurrence of a specific event in the predetermined operation from the event occurrence detector 107b when the occurrence of this event is detected by the event occurrence detector 107b, and judges a timing of receiving this detection signal as the arrival of the predetermined timing. (4) The operation unit 20 receives designation of the predetermined operation and a possible specific event in this operation (e.g. the predetermined operation is a sheet feeding operation by the pickup roller 2021 and the specific event is a sheet jam at the pickup roller 2021, etc.) from a user through an operation of the user and, when the designated operation and the occurrence of the specific event are detected by the event occurrence detector 107b, the timing information acquirer 11b receives a detection signal indicating this occurrence from the event occurrence detector 107b and judges a timing of receiving this detection signal as the arrival of the predetermined timing.

When detecting the arrival of the acquiring timing (YES in S41), the timing information acquirer 11b sends a transmission request signal requesting transmission of the event occurrence arrival timing information accumulated in the complex machines 32, 33 to all the other network-connected complex machines 32, 33 constituting the image forming system 10 (S42).

When the timing information transmitter 12b receives a request instruction signal from the complex machine 31b (SS41), each of all the other complex machines 32, 33 in the image forming system 10 reads the event occurrence arrival timing information stored in the storage unit (corresponding to the storage unit 170b) of the complex machine 32, 33 (SS42) and transmits the read event occurrence arrival timing information to the complex machine 31b having transmitted the transmission request signal (SS43).

In this embodiment, the complex machine 31b that transmits the transmission request signal does not specify the type information of the event occurrence arrival timing information requested to be transmitted and transmits the transmission request to all the other complex machines 32, 33. All the other complex machines 32, 33 having received the transmission request read all the pieces of event occurrence arrival timing information stored in the storage units of the complex machines 32, 33 and transmit them to the complex machine 31b having transmitted the transmission request signal when receiving the transmission request. How all the other complex machines 32, 33 having received the transmission request transmit the event occurrence arrival timing information is not limited to this form.

The timing information acquirer 11b of the complex machine 31b having transmitted the transmission request signal receives the event occurrence arrival timing information transmitted from the other complex machines 32, 33 (S43).

When the timing information acquirer 11b receives the event occurrence arrival timing information, the coinciding information extractor 108b discriminates whether or not the performance information of the other complex machines 32, 33 included in the received event occurrence arrival timing information and the performance information of the complex machine 31b stored in the performance information storage 17b coincide and extracts the event occurrence arrival timing information including the performance information coinciding with the performance information of the complex machine 31b out of the received event occurrence arrival timing information (S44).

Each of the other complex machines 32, 33 transmits event occurrence arrival timing information including elapse information indicating elapsed time from the first execution of the predetermined operation to the occurrence of the specific event in this operation in the complex machine and performance information indicating the performance of the complex machine to the complex machine 31b. An exemplary case is described where the type information indicating the type of the complex machine is used as this performance information.

The coinciding information extractor 108b of the complex machine 31b discriminates whether or not the type information as the performance information of the other complex machines 32, 33 included in the received event occurrence arrival timing information and the type information as the performance information of the complex machine 31b stored in the performance information storage 17b coincide. The coinciding information extractor 108b discriminates whether or not these pieces of type information coincide, and extracts the event occurrence arrival timing information including the coinciding type information out of the received event occurrence arrival timing information if these pieces of type information coincide. If the type is the same, mechanisms (e.g. respective mechanisms shown in FIG. 2 such as the image forming mechanism, the sheet feeding mechanism and the image reading mechanism) provided in the respective complex machines are similar, the predetermined operation is performed in a similar manner, and the predetermined event concerning the predetermined operation also similarly occurs. Thus, by analyzing the event occurrence arrival timing information transmitted to the complex machine 31b from the complex machines 32, 33 of the same type as the complex machine 31b, occurrence timings of events which could occur in the above respective mechanisms in the future in the complex machine 31b can be accurately calculated.

If color/monochromatic information as an example of the function information is used as the performance information, the coinciding information extractor 108b of the complex machine 31b discriminates whether or not color/monochromatic information of the other complex machines 32, 33 included in the received event occurrence arrival timing information and color/monochromatic information as the performance information of the complex machine 31b stored in the performance information storage 17b coincide and extracts the event occurrence arrival timing information including the coinciding color/monochromatic information out of the received event occurrence arrival timing information if these pieces of color/monochromatic information coincide. This is because the predetermined operation similarly occurs and the predetermined event concerning the predetermined operation similarly occurs for this function if the complex machines have the same executable function. However, the function information is not limited to the color/monochromatic information and may be information on another function (e.g. whether or not post-processing such as stapling can be performed, etc.). It does not matter whether the performance information used is composed of one or a plurality of pieces of function information.

If image forming speed information as an example of the narrow performance information is used as the performance information, the coinciding information extractor 108b of the complex machine 31b discriminates whether or not image forming speed information of the other complex machines 32, 33 included in the received event occurrence arrival timing information and image forming speed information as the performance information of the complex machine 31b stored in the performance information storage 17b coincide and extracts the event occurrence arrival timing information including the coinciding image forming speed information out of the received event occurrence arrival timing information if these pieces of image forming speed information coincide. This is because the predetermined operation similarly occurs and the predetermined event concerning the predetermined operation similarly occurs for the operating mechanism for executing this performance if the complex machines have the same executable performance. However, the narrow performance information is not limited to the image forming speed information and may be information on another narrow performance (e.g. document reading speed (number of documents read per minute) by the image reading unit 500, etc.). It does not matter whether the narrow performance information used is composed of one or a plurality of pieces of function information.

The coinciding information extractor 108b stores the extracted event occurrence arrival timing information in the storage unit 170b (S45). The event occurrence arrival timing information stored in the storage unit 170b in this way is only the event occurrence arrival timing information obtained in the other complex machines 32, 33 and having the performance coinciding with the performance (e.g. function described in the description of the above function information, narrow performance described in the description of the above narrow performance information, etc.) of the complex machine 31*b*. Thus, the event occurrence arrival timing information truly useful to calculate a timing at which the specific event concerning the predetermined operation could occur in the complex machine 31*b* is collected in the storage unit 170*b*.

In this embodiment, after the event occurrence arrival timing information is calculated in the complex machines 31*b*, 32 and 33, the respective complex machines 31*b*, 32 and 33 transmit the event occurrence arrival timing information to the other complex machine having transmitted a transmission request. However, the process of transmitting and receiving the event occurrence arrival timing information by the image forming system 10 is not limited to this.

For example, after the event occurrence arrival timing information is calculated in the complex machines 31*b*, 32 and 33, the respective complex machines 31*b*, 32 and 33 may transmit the event occurrence arrival timing information to the server SV1 and the server SV1 may receive and store the event occurrence arrival timing information and individually transmit the event occurrence arrival timing information to the complex machine having transmitted a transmission request as in the processings in SS41 to SS43 described above.

Figure 12:
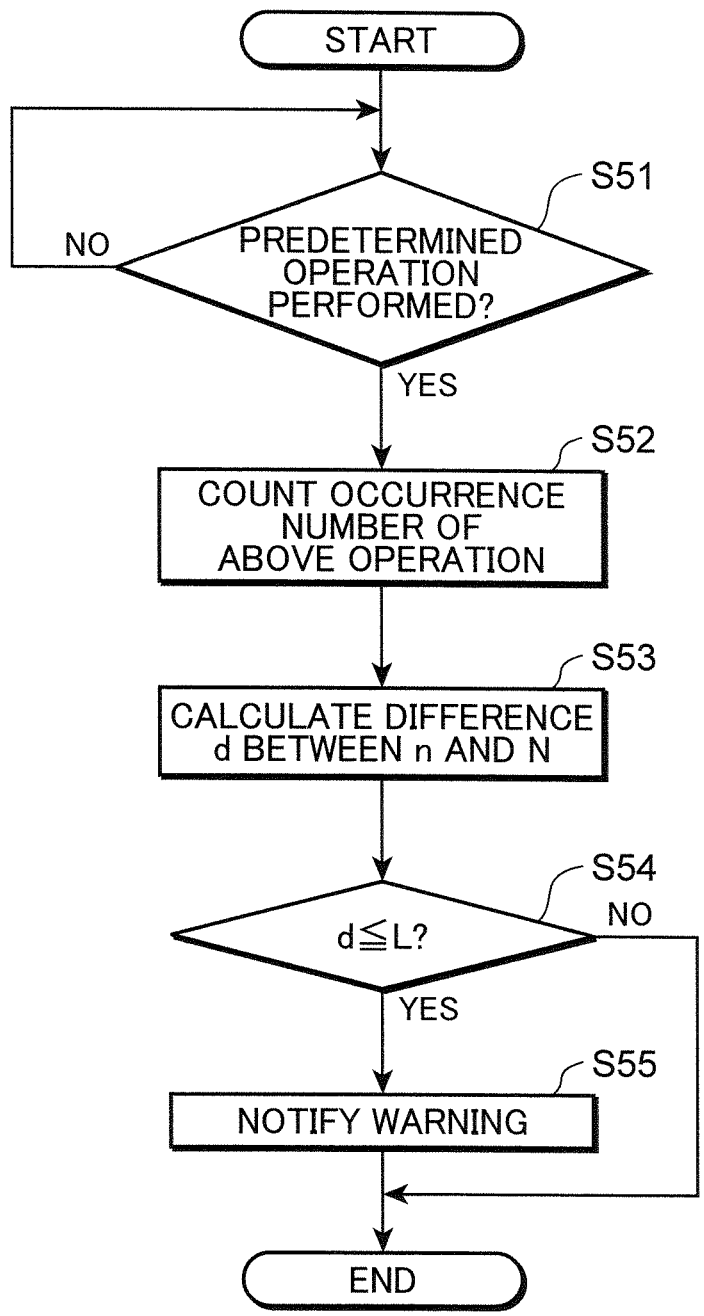
FIG. 12 is a flow chart showing a warning process in the complex machine according to the second embodiment.

Next, a warning process in the complex machine 31*b* is described. FIG. 12 is a flow chart showing the warning process in the complex machine 31*b*.

When the event occurrence detector 107*b* detects a specific event in a predetermined operation, e.g. a sheet jam at the pickup roller 2021 (YES in S51), the elapsed time information calculator 101*a* counts an occurrence number of the event to be detected (here, sheet jam at the pickup roller 2021) as elapsed time information by a built-in counter every time the detection is made (S52).

The difference calculator 105*b* calculates a difference d between the occurrence number (count value) n of the above event as the elapsed time information after the counting in S52 and an occurrence timing arrival number N indicated by information included in the event occurrence arrival timing information extracted by the coinciding information extractor 108*b* and stored in the storage unit 170*b* and indicating a predetermined operation and a specific event similar to the specific event in the predetermined operation, the occurrence of which was detected in S51 (S53).

The controller 103*b* judges whether or not the difference d is equal to or below the limit value L retained beforehand (whether or not the difference d has reached the limit value L) (S54). If the difference d is judged to be equal to or below the limit value L (YES in S54), the controller 103*b* causes a display unit 150 to display a warning message indicating that the predetermined event (sheet jam at the pickup roller 2021 in this example) may occur in the predetermined operation (sheet feeding operation by the pickup roller 2021 in this example) (S55).

The control executed by the controller 103*b* when the difference d is judged to be equal to or below the limit value L is not limited to the warning display operation by the display unit 150, and may be another operation by another operating mechanism.

Main effects of the second embodiment are described.

According to the second embodiment, the event occurrence arrival timing acquirer 11*b* acquires the event occurrence arrival timing information including the information until a specific event concerning the predetermined operation occurs in the other image forming apparatuses (complex machines 32, 33) and the performance information from the other image forming apparatuses or the server (server SV1), the coinciding information extractor 108*b* extracts the event occurrence arrival timing information including the performance information coinciding with the performance information stored in the performance information storage 17*b* out of the event occurrence arrival timing information acquired by the event occurrence arrival timing information acquirer 11*b*, the difference calculator 105*b* calculates a difference between elapsed time information indicating elapsed time which is calculated by the elapsed time information calculator 101*b* and during which the predetermined operation is performed in the image forming apparatus (complex machine 31*b*) and the event occurrence arrival timing information extracted by the coinciding information extractor 108*b*, and the determiner 106*b* causes a predetermined operating mechanism to perform a corresponding operation predetermined as a measure against the specific event when the difference is determined to have reached the predetermined light value by the determiner 106*b*.

In this way, each image forming apparatus of the invention can calculate approach to an occurrence timing of a specific event concerning the predetermined operation in the image forming apparatus based on occurrence timings of this event in the predetermined operation in other image forming apparatuses, and can perform a corresponding operation to deal with this event in this image forming apparatus before this event actually occurs concerning this operation.

Since the coinciding information extractor 108*b* extracts only the event occurrence arrival timing information in conformity with the performance of the image forming apparatus in each image forming apparatus of the present invention, an operation and an event which can occur in the image forming apparatus can be accurately dealt with using only information truly useful to calculate approach to an occurrence timing of the specific event concerning the predetermined operation.

Since the event occurrence arrival timing information transmitter 12*b* transmits the event occurrence arrival timing information calculated by the timing information calculator 104*b* to the other image forming apparatuses or the server according to the second embodiment, the image forming apparatus according to the second embodiment can provide the event occurrence arrival timing information on a specific event having occurred concerning a predetermined operation in this image forming apparatus to the other image forming apparatuses to enable the other image forming apparatuses to calculate an occurrence timing of the above event in the other image forming apparatuses.

Third Embodiment

A third embodiment of an image forming apparatus and an image forming system according to the present invention is described. A diagram showing a network configuration of the image forming system according to the third embodiment is the same as the diagram of FIG. 1 showing the network configuration of the image forming system 10 according to the first embodiment, and a sectional view showing a schematic construction of a complex machine according to the third embodiment is the same as the sectional view of FIG. 2 showing the schematic construction of the complex machine 31*a* according to the first embodiment. Thus, these diagrams are neither shown nor described.

Figure 13:
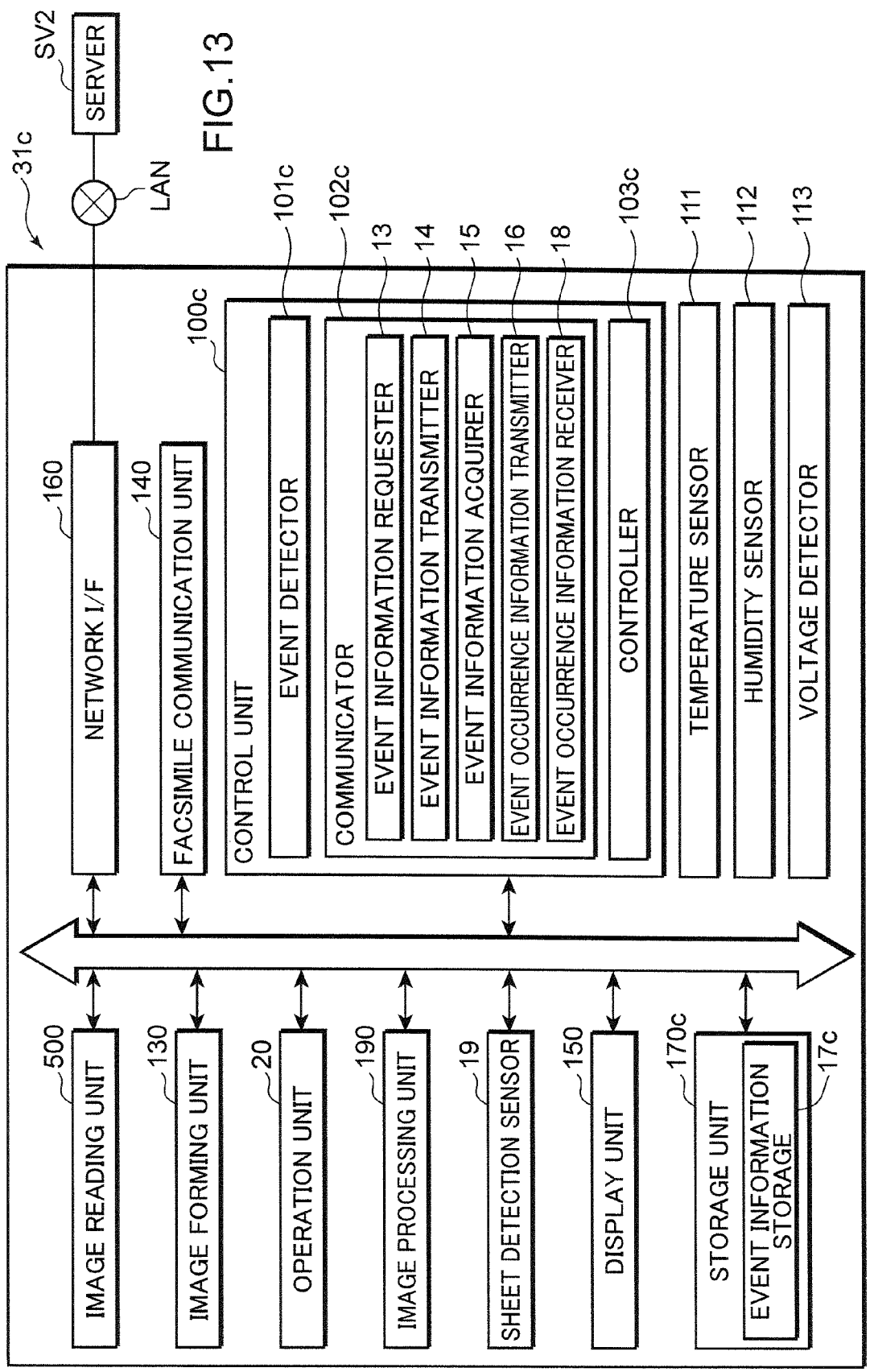
FIG. 13 is a block diagram schematically showing the internal construction of a complex machine according to a third embodiment.

FIG. 13 is a block diagram schematically showing the internal construction of a complex machine 31*c*. The construction of the complex machine 31*c* (32, 33) described below is not necessarily an essential element as the image forming apparatus according to the present invention, and can be one embodiment of the image forming apparatus according to the present invention if including a construction necessary to perform processes in the respective examples to be described later. An event information requester 13 and an event information acquirer 15 described below constitute an example of the acquirer, and a controller 103c constitutes an example of the processor.

The complex machine 31c includes a control unit 100c for controlling operations of the respective parts of the machine, an image reading unit 500 including a scanner and the like for reading a document image, and an image forming unit 130 for printing data of documents read by the image reading unit 500, data transmitted from a server SV2 and other data.

The complex machine 31c also includes a facsimile communication unit 140 for implementing various functions necessary for facsimile communication and receiving image data from external facsimile machines via a public line, an operation unit 20 including a print or transmit start key, a numerical pad and abbreviated number keys and the like and adapted to receive the input of various operation instructions from an operator (print setting input, instruction to print a print setting sheet, etc.) and a display unit 150 (an example of the notifier) 150 composed of an LCD (Liquid Crystal Display) and the like for displaying operation guidance and the like for the operator. Note that this display unit 150 may receive various operation instructions from the operator by having a touch panel function.

The complex machine 31c further includes a storage unit 170c composed of an HDD (hard disk) or a memory for storing document image data read by the image reading unit 500 and the like. A partial area of this storage unit 170c functions as an event information storage 17c and the storage unit 170c receives document image data read by the image reading unit 500 and event information indicating a detected event from an event detector 101c when a predetermined event is detected by the event detector 101c, and stores the received data and information.

The control unit 100c is composed of a CPU and the like and responsible for the overall operation of the complex machine 31c. The control unit 100c includes the event detector 101c, a communicator 102c and a controller 103c.

The event detector 101c detects a predetermined event which occurs in this complex machine 31c, for example, in any one of the following manners. (1) The event detector 101c judges that a predetermined threshold (e.g. 35° C.) has been reached based on temperature information obtained from a temperature sensor 111 and detects the occurrence of a sheet jam due to a high temperature (operation error due to a high temperature) as an example of the above event on the condition that a sheet jam is judged to have occurred based on a signal from a sheet detection sensor 19. (2) The event detector 101c judges that a predetermined threshold (e.g. 80%) has been reached based on humidity information obtained from a humidity sensor 112 and detects the occurrence of a sheet jam due to a high humidity (operation error due to a high humidity) as an example of the above event on the condition that a sheet jam is judged to have occurred based on a signal from the sheet detection sensor 19. (3) The event detector 101c detects the occurrence of an operation error due to voltage abnormality as an example of the above event on the condition that a predetermined threshold (e.g. 11 V) is judged to have been reached based on voltage information received from a voltage detector 113. (4) The event detector 101c detects the occurrence of a communication error as an example of the above event when receiving communication error information indicating the occurrence of a network communication error between the complex machine 31c and the server SV2, the other complex machine 32 or 33 or an unillustrated personal computer on a network from a network I/F 160. Note that the predetermined event is not limited to these examples.

The event detector 101c of the complex machine 31c is an example of a first event detector. Event detectors of the complex machines 32, 33 are an example of a second event detector.

The sheet detection sensor 19 outputs an H (high) signal from a light receiving element when light from a light emitting element is received by the light receiving element while outputting an L (low) signal from the light receiving element when no light from the light emitting element can be received by the light receiving element (when light is blocked). These signals are output to the event detector 101c.

The event detector 101c detects the occurrence of a specific event in a predetermined operation in the complex machine 31c. Since a recording sheet P stays between the light emitting element and the light receiving element of the sheet detection sensor 19 for a time equal to or longer than a time t1 when a jam occurs, an L (low) signal of a period exceeding the time t1 is output from the light receiving element to the event detector 101c. For example, the event detector 101c judges that there is no jam when receiving a signal which rises from L to H after the time t1 following a fall timing from H to L (FIG. 4A) and judges that a jam has occurred when receiving a signal which does not rise from L to H even after the elapse of the time t1 following a fall timing from H to L (FIG. 4B) based on the signal output from the sheet detection sensor 19.

The communicator 102c performs a process necessary for data transmission and reception to and from the server SV2 and the other complex machines 32, 33. The communicator 102c includes the event information requester 13, an event information transmitter 14, the event information acquirer 15, an event occurrence information transmitter 16 and an event occurrence information receiver 18.

The event information requester 13 transmits a transmission request for event information indicating an event, which is of the same type as the event (event detected by the event detector 101c) having occurred in the complex machine 31c and has occurred in the other complex machine 32, 33, to the other complex machines 32, 33 when the above event is detected by the event detector 101c.

The event information transmitter 14 receives the transmission request for the event information transmitted from the other complex machine 32, 33, reads the event information on the event indicated by the transmission request out of the event information detected by the event detector 101c and stored in the storage unit 170c, and transmits the read event information to the complex machine having transmitted the transmission request.

The event occurrence acquirer 15 receives and acquires the event information transmitted from the other complex machines 32, 33 in response to the transmission request transmitted to the other complex machines 32, 33 by the event information requester 13.

The event occurrence information transmitter 16 transmits event occurrence information indicating the occurrence of the above event in the complex machine 31c to the other complex machines 32, 33.

The event occurrence information receiver 18 receives event occurrence information indicating the occurrence of the above event in the other complex machines 32, 33 from the other complex machines 32, 33.

The controller 103c is responsible for operation controls of the entire complex machine 31c. For example, the controller 103c causes the respective operating mechanisms of the complex machine 31c to perform a printing operation, a copying operation and the like. The controller 103c is an example of a first controller.

The temperature sensor 111 is a known sensor such as thermistor and detects an ambient environmental temperature of the complex machine 31c. The temperature sensor 111 sends temperature information indicating the detected temperature to the event detector 101c and the like.

The humidity sensor 112 used is an appropriate known humidity sensor and detects, for example, an ambient environmental humidity of the complex machine 31c. The humidity sensor 112 sends humidity information indicating the detected humidity to the event detector 101c and the like.

The voltage detector 113 used is an appropriate known voltmeter and detects a drive voltage of the complex machine 31c (drive voltage for driving an actuator mechanism for the image forming unit 130 and the like) and a control voltage (voltage for driving a control circuit mounted on a control board). The voltage detector 113 sends voltage information indicating the detected voltage to the event detector 101c and the like.

The complex machine 31c further includes an image processing unit 190 for performing processes of editing/processing image data read by the image reading unit 500 (coding/decoding processes, size enlargement/reduction processes, compression/expansion processes), and a network I/F 160 used for transfer of various data to and from the server SV2 and the complex machines 32, 33.

A sheet jam at the pickup roller 2021 used to judge the occurrence of the above event is merely an example of the event and the event is not limited to this. The event may be, for example, one of the following examples: (a) sheet jam at a feed roller 602 of a document feeding unit 600, (b) document image reading error (determined by a known document image reading error determination) in the image reading unit 500 and (c) toner empty detection (detection by a known detection method using a toner remainder detection sensor) in the developing device 207.

Figure 14:
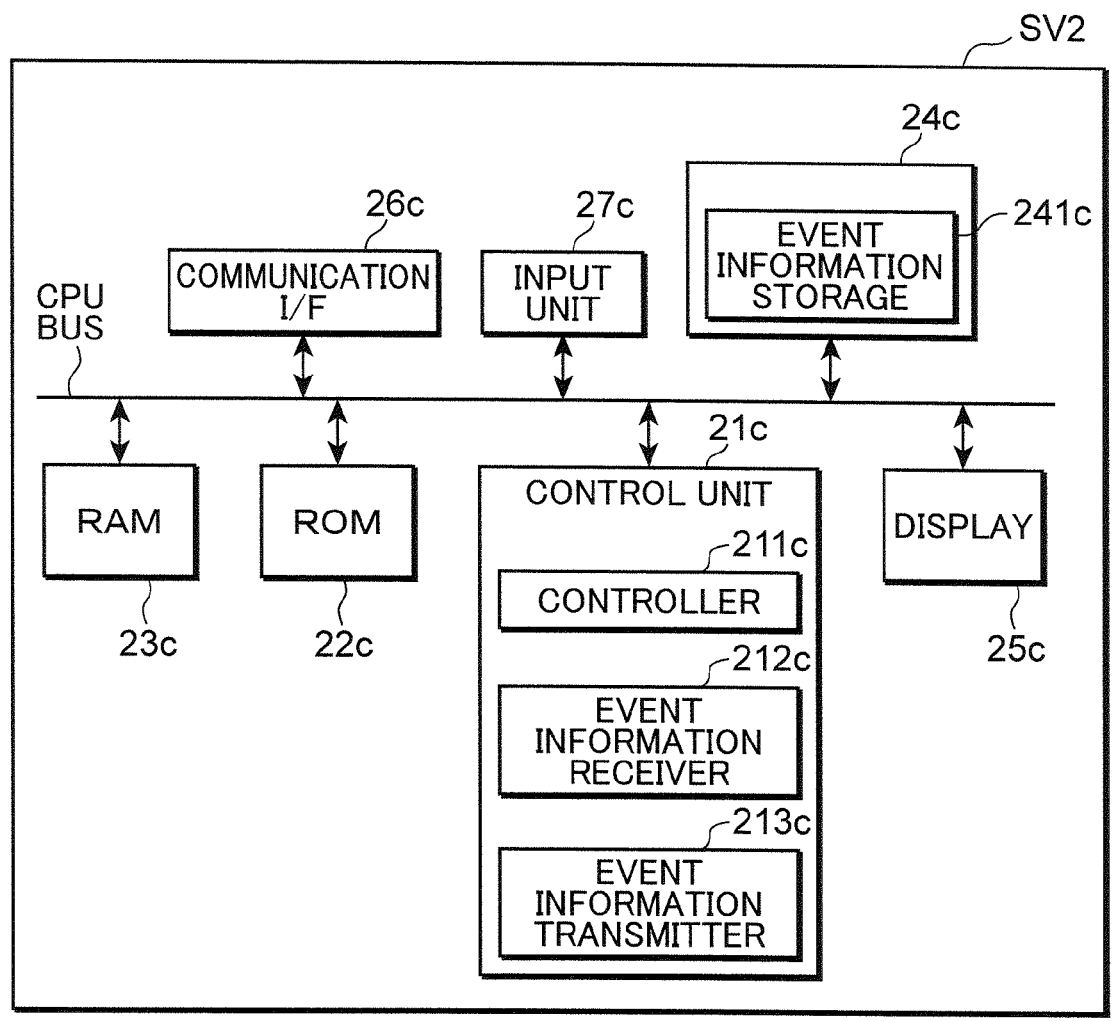
FIG. 14 is a block diagram schematically showing the internal construction of a server according to the third embodiment.

FIG. 14 is a block diagram schematically showing the internal construction of the server SV2 according to the third embodiment. The server SV2 includes a control unit 21c, a ROM 22c, a RAM 23c, a storage unit 24c, a display 25c, a communication I/F 26c and an input unit 27c. These parts are capable of transmitting and receiving data or signals to and from each other via a CPU bus.

The control unit 21c is composed of a CPU and the like and responsible for operation controls of the entire server SV2. The ROM 22c stores an operation program on respective operations of the server SV2. The RAM 23c is used as an operation area and the like of a controller 211c.

The storage unit 24c is composed of an HDD and the like and a part of a storage area thereof functions as an event information storage 241c for storing event information received from the complex machines 31c, 32 and 33 by an event information receiver 212c.

The display 25c is composed of an LCD (Liquid Crystal Display) and the like and displays contents of various data, operation guidance for a user who operates the server SV2 and the like. The communication I/F 26c functions as an interface for data communication between the server SV2 and the complex machines 31c, 32 and 33. The input unit 27c includes a keyboard, a mouse and the like and jobs to the server SV2 are entered by the user.

The control unit 21c is composed of a CPU and the like and includes the controller 211c, the event information receiver 212c and an event occurrence information transmitter 213c.

The controller 211c is responsible for operation controls of the entire server SV2. The controller 211c is an example of a second controller. The controller 103c of the complex machine 31c is an example of the first controller.

The event information receiver 212c receives the event information transmitted from the event information transmitters 14 of the complex machines 31c, 32 and 33.

The event occurrence information transmitter 213c transmits event occurrence information to the plurality of complex machines 31c, 32 and 33.

When the event information is received from any one of the plurality of complex machines 31c, 32 and 33 by the event information receiver 212c, the controller 211c further determines whether or not any event information indicating the same type of event as the event indicated by the received event information and received from the complex machine different from the complex machine having transmitted the received event information is already stored in the event information storage 241c. If this event information is stored, the controller 211c causes the event occurrence information transmitter 213c to transmit the event occurrence information to (1) the complex machine having transmitted the above event information or (2) to all the complex machines 31c, 32 and 33.

Figure 15:
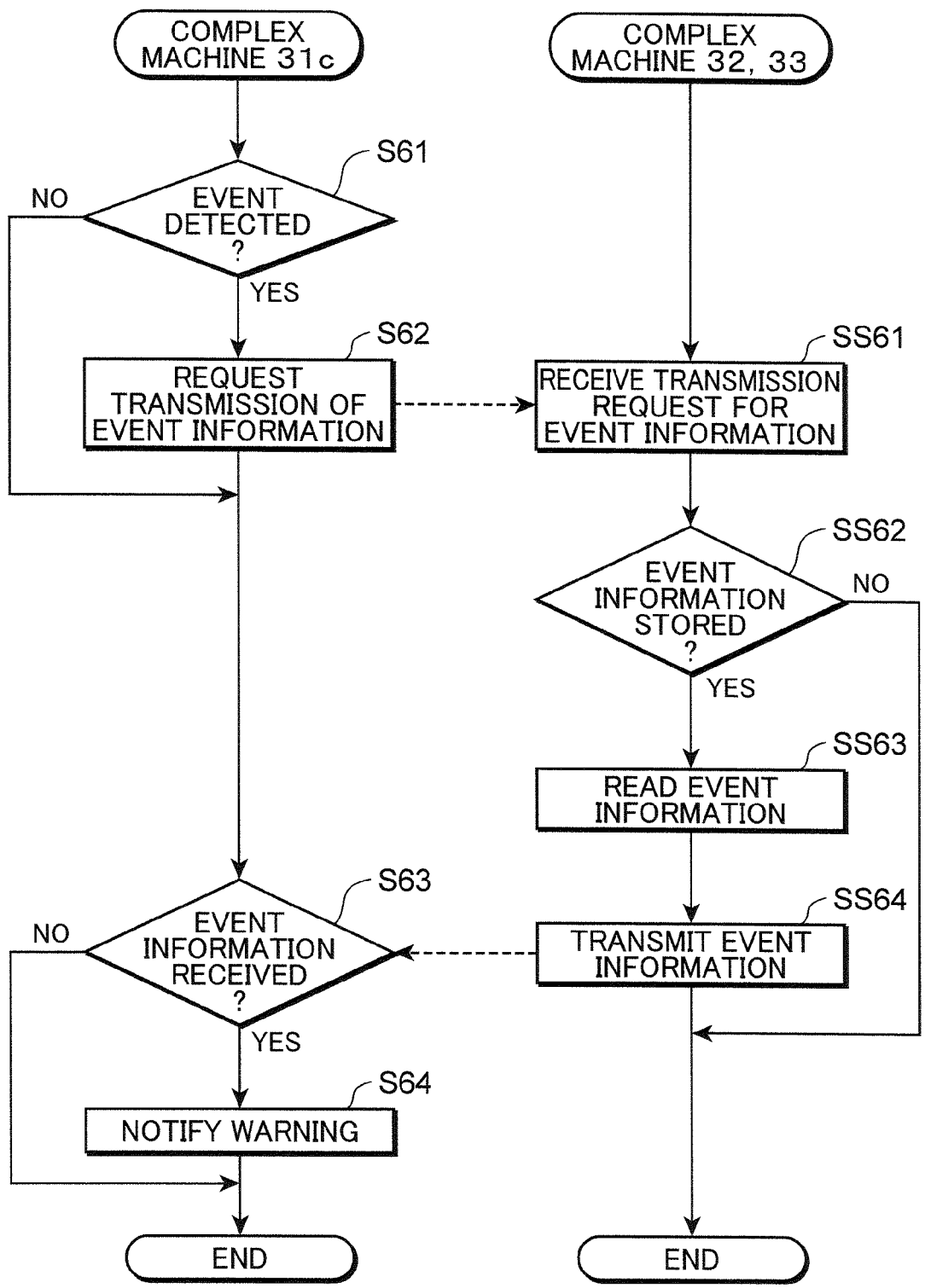
FIG. 15 is a flow chart showing a first example of a process of transmitting and receiving event information by an image forming system according to the third embodiment.

Next, a first example of a process of transmitting and receiving event information by the image forming system 10 according to the third embodiment is described. FIG. 15 is a flow chart showing the first example. Although the complex machine 31c transmits a transmission request for event information to the other complex machines 32, 33 in the following example, any complex machine performs a process similar to that of the complex machine 31c described below to the other complex machines. The same holds true for respective examples described below.

When the event detector 101c detects the occurrence of the predetermined event in the complex machine 31c (YES in S61), the event information requester 13 transmits a transmission request signal requesting transmission of event information relating to the same type of event as the detected event and accumulated in the storage units (corresponding to the storage units 170c) of the complex machines 32, 33 to all the other network-connected complex machines 32, 33 constituting the image forming system 10 (S62). If NO in S61, the flow chart proceeds to a processing in S63.

When receiving the transmission request signal from the complex machine 31c (SS61), the event information transmitter 14 of each of all the other complex machines 32, 33 judges whether or not the event information on the event indicated by the transmission request signal is stored in the storage unit of the complex machine 32, 33 (SS62). If judging that the event information on the event indicated by the transmission request signal is stored in the storage unit of the complex machine 32, 33 (YES in SS62), the event information transmitter 14 reads this event information from the storage unit of the complex machine 32, 33 (SS63) and transmits the read event information to the complex machine 31c having transmitted the transmission request signal (SS64).

If judging that the event information on the event indicated by the transmission request signal is not stored in the storage unit of the complex machine 32, 33 (NO in SS62), the event information transmitter 14 ends the process in the complex machine 32, 33.

When the event information acquirer 15 of the complex machine 31c having transmitted the transmission request signal receives the event information from the other complex machine 32, 33 (YES in S63), the controller 103c causes the display unit 150 to display a warning message indicating the occurrence of the same event in a plurality of complex machines (S64). By this warning, a user can recognize the presence of an important problem (occurrence of an event assumed to be critical) frequently occurring in a plurality of complex machines on the network and can take measures against this problem. If the event information requester 13 of the complex machine 31c having transmitted the transmission requesting instruction does not receive the event information from the other complex machines 32, 33 (NO in S63), the process in the complex machine 31c ends.

Figure 16:
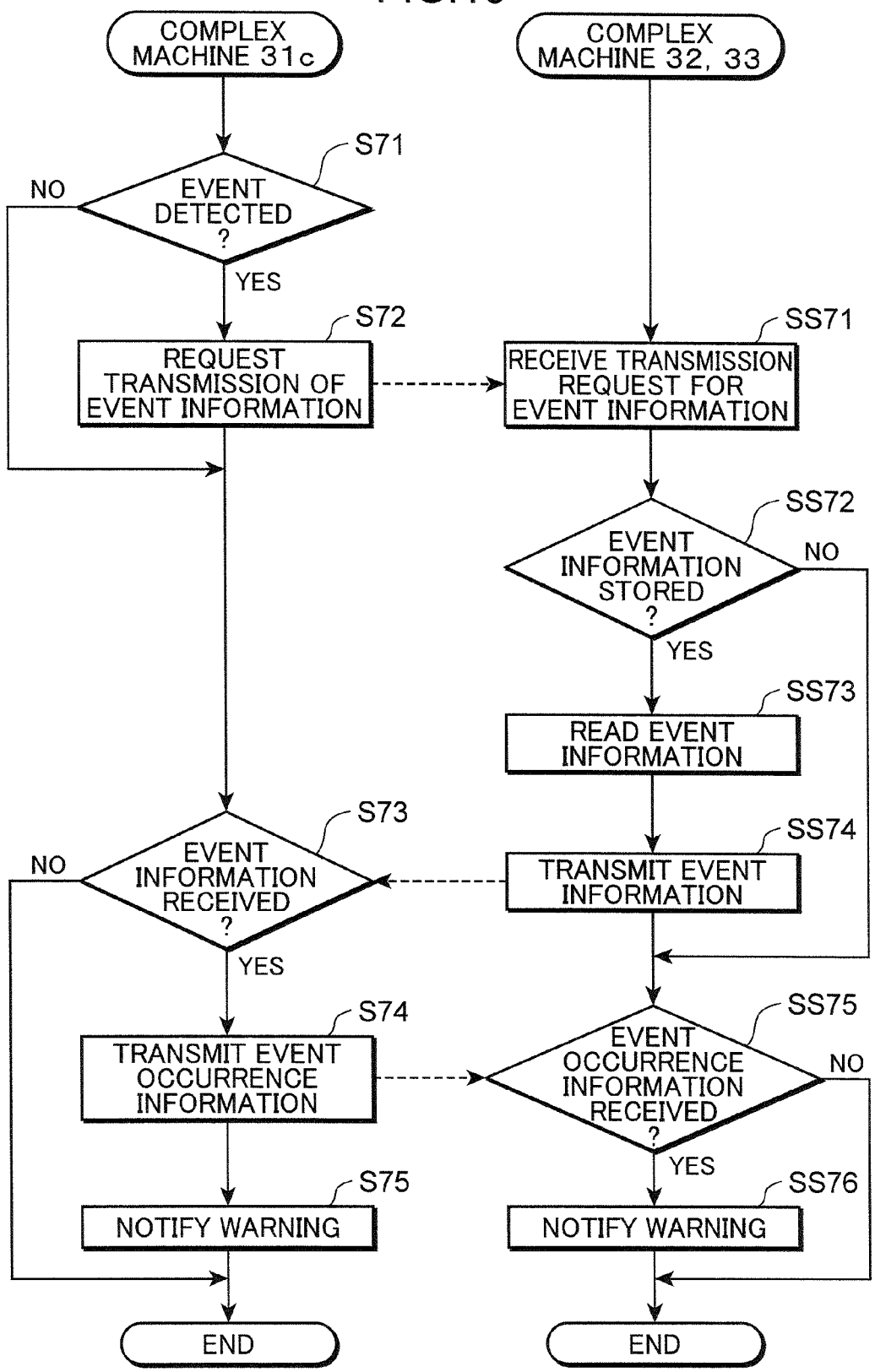
FIG. 16 is a flow chart showing a second example of the process of transmitting and receiving the event information by the image forming system according to the third embodiment.

Next, a second example of the process of transmitting and receiving event information by the image forming system 10 according to the third embodiment is described. FIG. 16 is a flow chart showing the second example. Processings similar to those of the first example are not described.

In the second example, when receiving the event information transmitted from the other complex machine 32, 33 (YES in S73), the event information acquirer 15 of the complex machine 31c having transmitted the transmission request signal transmits event occurrence information indicating the occurrence of the event indicated by the received event information to all the other complex machines on the network including the one having transmitted the event information (S74).

When the event occurrence information receiver 18 of each of the complex machines 32, 33 receives the event occurrence information (YES in S75), the controller 103c of this complex machine causes the display unit 150 to display a warning message indicating the occurrence of the same type of event in a plurality of complex machines (SS76). This complex machine 31c enables users of the other complex machines 32, 33 to recognize the presence of an important problem frequently occurring in a plurality of complex machines on the network. If the event occurrence information receiver 18 of each complex machine does not receive the event occurrence information (NO in SS75), this process ends without performing the processing in SS76.

Figure 17:
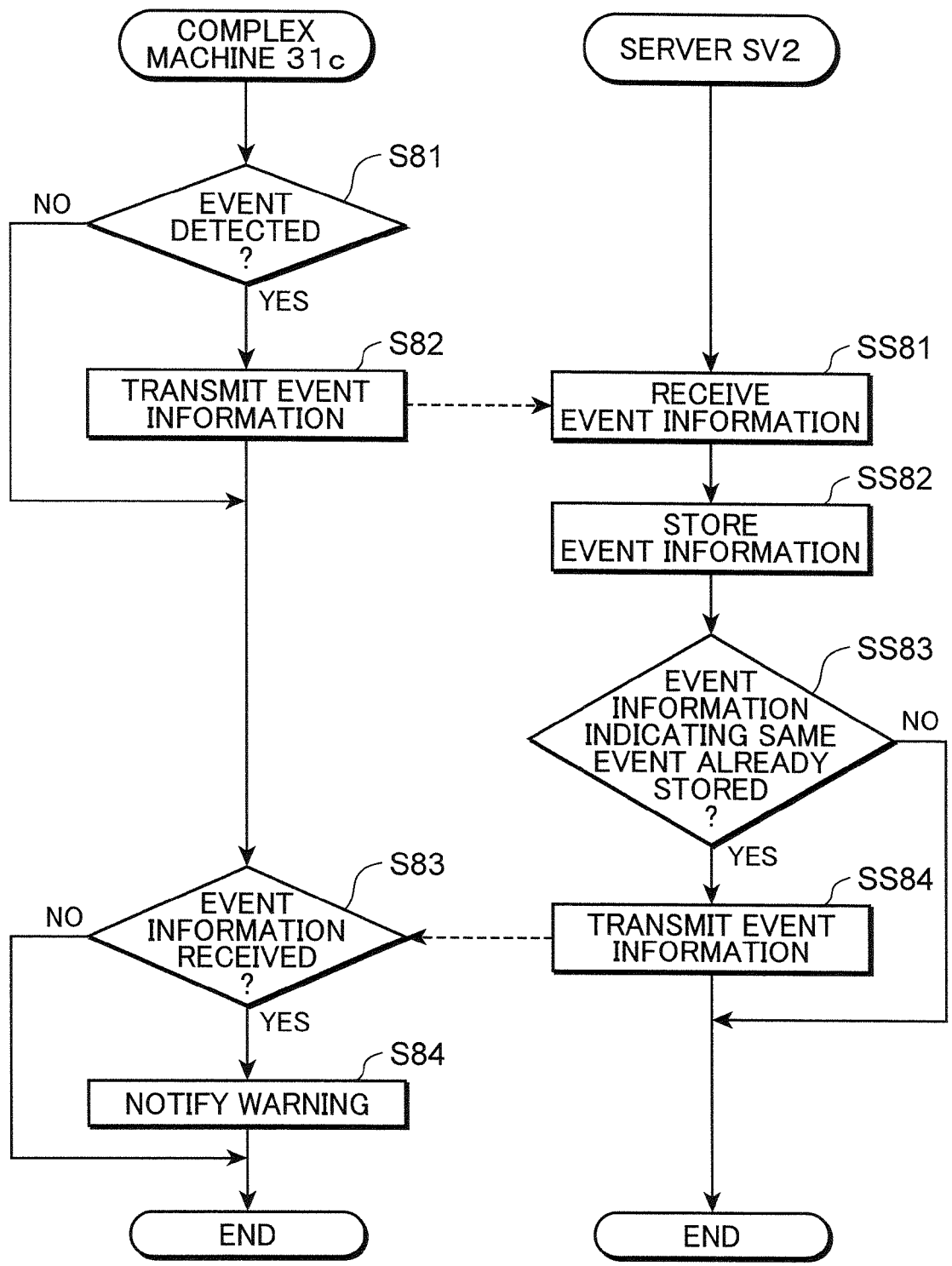
FIG. 17 is a flow chart showing a third example of the process of transmitting and receiving the event information by the image forming system according to the third embodiment.

Next, a third example of the process of transmitting and receiving event information by the image forming system 10 according to the third embodiment is described. FIG. 17 is a flow chart showing the third example.

When the event detector 101c detects the occurrence of the predetermined event in each of the complex machines 31c, 32 and 33 (YES in S81), the event information transmitter 14 transmits event information indicating the detected event to the server SV2 (S82).

When the event information receiver 212c of the server SV2 receives this event information (SS81), the received event information is stored in the event information storage 241c (SS82). Then, the controller 211c determines whether or not any event information indicating the same type of event as the event indicated by the received event information and received from the complex machine different from the complex machine having transmitted this event information is already stored in the event information storage 241c (SS83).

If determining that the event information from the different other complex machine is already stored in the event information storage 241c (YES in SS83), the controller 211c causes the event occurrence information transmitter 213c to transmit event occurrence information indicating the occurrence of the same event in a plurality of complex machines to all the complex machines on the network including the one having transmitted the above event information (SS84). If the controller 211c determines that the event information from the different other complex machine is not yet stored in the event information storage 241c (NO in SS83), the processing in S84 is not performed.

When the event occurrence information receiver 18 of each complex machine receives the event occurrence information from the server SV2 (YES in S83), the controller 103c of each complex machine causes the display unit 150 to display a warning message indicating the occurrence of the same event in a plurality of complex machines (S84). This enables users of all the complex machines to recognize the presence of an important problem frequently occurring in a plurality of complex machines on the network. If the event occurrence information receiver 18 of each complex machine does not receive the event occurrence information (NO in S83), the process ends without performing the processing in S84.

If the event information is transmitted and received among the complex machines 31c, 32 and 33 and the above warning is made in each complex machine as shown in the first and second examples, the image forming system according to the third embodiment is composed of a plurality of complex machines and the server SV2 is not necessary. If the event information transmitted from the complex machines 31c, 32 and 33 shown in the third example is managed by the server SV2 as in the third example, the server SV2 is a necessary constituent of the image forming system according to the third embodiment.

Main effects of the third embodiment are described.

In the third embodiment, when an event is detected by the event detector 101c, the event information requester 13 transmits a transmission request for event information indicating an event, which is of the same type as the event having occurred in the operating mechanism in the image forming apparatus (complex machine 31c) and has occurred in the other image forming apparatuses, to the other image forming apparatuses (complex machines 32, 33) and the event information corresponding to the transmission request is acquired from the other image forming apparatus by the event information acquirer 15, the controller 103c causes the operating mechanism to perform a predetermined corresponding operation. That is, in the third embodiment, the operation corresponding to the event should be immediately performed when this event occurs not only in this image forming apparatus and the same type of event also occurs in the other image forming apparatus(s). Thus, if this operation is, for example, a notification operation to users, it can be quickly notified to the users when the event occurs that the operation corresponding to this event should be performed. Further, accuracy in performing this notification based on the occurrence of this event (i.e. accuracy in judging the importance of the occurrence of this event) can also be ensured.

According to the third embodiment, when an event occurs in the image forming apparatus, it can be quickly notified to the user that this event should be dealt with and accuracy in performing this notification based on the occurrence of this event can be ensured.

According to the third embodiment, when an event occurs in the image forming apparatus, it can be quickly notified to other image forming apparatus(s), in which the same type of event as this event has occurred, that this event should be dealt with, and accuracy in transmitting the event occurrence information to the other image forming apparatus(s) based on the occurrence of this event can also be ensured.

According to the third embodiment, when the event information receiver 212c receives event information from each image forming apparatus at the time of detecting an event in the image forming apparatus and any event information indicating the same type of event as the event indicated by the received event information and received from the other image forming apparatus is stored in the event information storage 241c in the server (server SV2), the controller 211c causes the event occurrence information transmitter 213*c* to transmit event occurrence information indicating the occurrence of the event to at least any one of a plurality of image forming apparatuses. Thus, when an event occurs in any one of the image forming apparatuses on the network, the event occurrence information indicating the fact about the event occurrence can be quickly transmitted to the other image forming apparatus, in which the same type of event has occurred, to notify that this event should be dealt with, and accuracy in performing this notification based on this event occurrence (i.e. accuracy in judging the importance of the occurrence of this event) can also be ensured.

The terms used in the first to third embodiments are additionally explained. The "event occurrence arrival timing information" of the first embodiment may include trouble information. The trouble information means a period during which and/or the number of times by which an operation has been performed from the first execution of this operation to the occurrence of a trouble in this operation after the first use of the image forming apparatus (complex machine 31*a*, 32, 33) and/or after the maintenance of the image forming apparatus when a trouble occurs in the operation of the image forming apparatus. The operation means, for example, automatic document feeding by the document feeding unit 600. The trouble means, for example, a jam which occurs in the document feeding unit 600. The same holds true for the second embodiment.

The "elapsed time information" of the first embodiment may include execution information. The execution information means a period during which and/or the number of times by which an operation has been performed from the first execution of this operation to the present after the first use of the image forming apparatus (complex machine 31*a*, 32, 33) and/or after the maintenance of the image forming apparatus. The same holds true for the second embodiment.

The "difference" calculated by the difference calculator 105*a* of the first embodiment may be a value obtained by subtracting the execution information from the trouble information. The same holds true for the second embodiment.

The "event" of the third embodiment may include the occurrence of a trouble in an operation of the image forming apparatus (complex machine 31*a*, 32, 33).

Using the above terms, the image forming apparatus is specified as follows. An image forming apparatus is to be network-connected and includes an acquirer for requesting event information indicating a specific event having occurred in another image forming apparatus via a network and acquiring the event information transmitted via the network in response to the request, and a processor for performing a predetermined process to deal with the specific event when the event information is acquired by the acquirer. According to this image forming apparatus, the event information indicating the specific event having occurred in the other image forming apparatus is acquired and the predetermined process is performed to deal with the specific event. Thus, the specific event that occurs in the image forming apparatus (i.e. that has occurred or may possibly occur) can be efficiently dealt with.

The image forming apparatus having the above construction can be further limited as follows. The event information includes event occurrence arrival timing information which is a period during which and/or the number of times by which a predetermined operation has been performed from the first execution of the operation to the occurrence of a trouble in the operation after the first use of the other image forming apparatus and/or after the maintenance of the other image forming apparatus when the predetermined operation is performed in the other image forming apparatus and a trouble occurs in the operation; the image forming apparatus further includes an elapsed time information calculator for calculating elapsed time information which is a period during which and/or the number of times by which the operation has been performed from the first execution of the operation to the present after the first use of the image forming apparatus and/or after the maintenance of the image forming apparatus when the operation is performed in the image forming apparatus; the processor includes a difference calculator for calculating a difference between the event occurrence arrival timing information acquired by the acquirer and the elapsed time information calculated by the elapsed time information calculator, a determiner for determining whether or not the difference calculated by the difference calculator has reached a predetermined limit value, and a notifier for giving a warning when the difference is determined to have reached the limit value by the determiner.

According to this construction, a user can be warned before a trouble occurs concerning a predetermined operation performed in the image forming apparatus.

This application is based on Japanese Patent application Nos. 2010-194112, 2010-194113 and 2010-193765 filed in Japan Patent Office on Aug. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus to be network-connected, comprising:
    an acquirer for requesting event information indicating a specific event having occurred in another image forming apparatus via a network and acquiring the event information transmitted via the network in response to the request; and
    a processor for performing a predetermined process to deal with the specific event when the event information is acquired by the acquirer, wherein:
    the image forming apparatus is network-connected to the other image forming apparatus or a server capable of data communication with the other image forming apparatus;
    the event information includes event occurrence arrival timing information indicating elapsed time from the first execution of a predetermined operation to the occurrence of the specific event in the operation in the other image forming apparatus;
    the image forming apparatus further comprises an elapsed time information calculator for calculating elapsed time information from the first execution of the operation to a time of execution of the operation when the operation is executed in the image forming apparatus;
    the acquirer is a timing information acquirer for acquiring the event occurrence arrival timing information from the other image forming apparatus or the server; and
    the processor includes:
        a difference calculator for calculating a difference between the elapsed time information calculated by the elapsed time information calculator and the event occurrence arrival timing information acquired by the timing information acquirer;

a determiner for determining whether or not the difference calculated by the difference calculator has reached a predetermined limit value; and a controller for causing a predetermined operating mechanism to perform a corresponding operation predetermined as a measure against the specific event when the difference is determined to have reached the limit value by the determiner.

2. An image forming apparatus according to claim 1, wherein:

the timing information acquirer acquires the event occurrence arrival timing information every time a predetermined timing arrives;

the image forming apparatus further comprises an event occurrence detector for detecting the occurrence of the specific event in the operation in the image forming apparatus; and the timing information acquirer acquires the event occurrence arrival timing information as an arrival timing of the predetermined timing when the occurrence of the specific event in the operation is detected by the event occurrence detector.

3. An image forming apparatus according to claim 2, further comprising a designation receiver for receiving an instruction to designate the operation and the content of the specific event from a user, wherein:

the timing information acquirer acquires the event occurrence arrival timing information when the operation and the specific event indicated by the instruction received by the designation receiver are detected by the event occurrence detector.

4. An image forming apparatus according to claim 2, further comprising a timing designation receiver for receiving an instruction to designate the predetermined timing from a user, wherein:

the timing information acquirer acquires the event occurrence arrival timing information every time the timing indicated by the instruction received by the timing designation receiver arrives.

5. An image forming apparatus according to claim 1, wherein:

the event information includes event occurrence arrival timing information indicating elapsed time from the first execution of the operation to the occurrence of the specific event in the operation in the image forming apparatus; and the image forming apparatus further comprises:

a timing information calculator for calculating the event occurrence arrival timing information of the image forming apparatus; and a timing information transmitter for transmitting the event occurrence arrival timing information of the image forming apparatus calculated by the timing information calculator to the other image forming apparatus or the server.

6. An image forming apparatus to be network-connected, comprising:

an acquirer for requesting event information indicating a specific event having occurred in another image forming apparatus via a network and acquiring the event information transmitted via the network in response to the request; and a processor for performing a predetermined process to deal with the specific event when the event information is acquired by the acquirer, wherein:

the image forming apparatus is network-connected to the other image forming apparatus or a server capable of data communication with the other image forming apparatus;

the event information includes event occurrence arrival timing information including elapse information indicating elapsed time from the first execution of a predetermined operation to the occurrence of the specific event in the operation in the other image forming apparatus and performance information indicating a performance of the other image forming apparatus;

the image forming apparatus further comprises an elapsed time information calculator for calculating elapsed time information from the first execution of the operation to a time of execution of the operation when the operation is executed in the image forming apparatus;

the acquirer is a timing information acquirer for acquiring the event occurrence arrival timing information from the other image forming apparatus or the server; and the processor includes:

a performance information storage for storing one or a plurality of pieces of performance information indicating a performance of the image forming apparatus;

a coinciding information extractor for extracting the event occurrence arrival timing information including the performance information of the other image forming apparatus coinciding with the performance information of the image forming apparatus stored in the performance information storage when the event occurrence arrival timing information is acquired by the timing information acquirer;

a difference calculator for calculating a difference between the elapsed time information calculated by the elapsed time information calculator and the elapse information of the event occurrence arrival timing information of the other image forming apparatus extracted by the coinciding information extractor;

a determiner for determining whether or not the difference calculated by the difference calculator has reached a predetermined limit value or less than the limit value; and a controller for causing a predetermined operating mechanism to perform a corresponding operation predetermined as a measure against the specific event when the difference is determined to have reached the limit value or less than the limit value by the determiner.

7. An image forming apparatus according to claim 6, further comprising:

a timing information calculator for calculating elapse information indicating elapsed time from the first execution of the operation to the occurrence of the specific event in the operation in the image forming apparatus; and a timing information transmitter for transmitting event occurrence arrival timing information including the elapse information of the image forming apparatus calculated by the timing information calculator and the performance information of the image forming apparatus stored in the performance information storage to the other image forming apparatus or the server.

8. An image forming apparatus to be network-connected, comprising:

an acquirer for requesting event information indicating a specific event having occurred in another image forming apparatus via a network and acquiring the event information transmitted via the network in response to the request; and a processor for performing a predetermined process to deal with the specific event when the event information is acquired by the acquirer, wherein:

the image forming apparatus is network-connected to the other image forming apparatus and further comprises an event detector for detecting the specific event having occurred in the image forming apparatus;

the acquirer includes:

an event information requester for transmitting a transmission request for the event information indicating an event, which is of the same type as the specific event having occurred in the image forming apparatus and has occurred in the other image forming apparatus, to the network-connected other image forming apparatus when the specific event is detected by the event detector; and an event information acquirer for acquiring the event information of the other image forming apparatus transmitted from the other image forming apparatus in response to the transmission request transmitted from the event information requester to the other image forming apparatus;

the processor includes a controller for causing a predetermined operating mechanism to perform a predetermined corresponding operation when the event information of the other image forming apparatus is acquired by the event information acquirer;

the operating mechanism is a communicator for communicating with the other image forming apparatus; and the controller causes the communicator to transmit event occurrence information indicating the occurrence of the event to the other image forming apparatus as the predetermined corresponding operation.

10. An image forming apparatus to be network-connected, comprising:

an acquirer for requesting event information indicating a specific event having occurred in another image forming apparatus via a network and acquiring the event information transmitted via the network in response to the request; and a processor for performing a predetermined process to deal with the specific event when the event information is acquired by the acquirer, wherein:

the event information includes event occurrence arrival timing information which is a period during which and/or the number of times by which a predetermined operation has been performed from the first execution of the operation to the occurrence of a trouble in the operation after the first use of the other image forming apparatus and/or after the maintenance of the other image forming apparatus when the operation is performed in the other image forming apparatus and a trouble occurs in the operation;

the image forming apparatus further comprises an elapsed time information calculator for calculating elapsed time information which is a period during which and/or the number of times by which the operation has been performed from the first execution of the operation to the present after the first use of the image forming apparatus and/or after the maintenance of the image forming apparatus when the operation is performed in the image forming apparatus; and the processor includes:

a difference calculator for calculating a difference between the event occurrence arrival timing information acquired by the acquirer and the elapsed time information calculated by the elapsed time information calculator;

a determiner for determining whether or not the difference calculated by the difference calculator has reached a predetermined limit value; and a notifier for notifying a warning when the difference is determined to have reached the limit value by the determiner.

11. An image forming system in which an image forming apparatus and another image forming apparatus are network-connected, wherein the image forming apparatus includes:

an acquirer for requesting event information indicating a specific event having occurred in the other image forming apparatus via a network to the other image forming apparatus and acquiring the event information transmitted via the network in response to the request; and a processor for performing a predetermined process to deal with the specific event when the event information is acquired by the acquirer, wherein:

the event information includes event occurrence arrival timing information indicating elapsed time from the first execution of a predetermined operation to the occurrence of the specific event in the operation in the other image forming apparatus;

the image forming apparatus further includes an elapsed time information calculator for calculating elapsed time information from the first execution of the operation to a time of execution of the operation when the operation is executed in the image forming apparatus;

the acquirer is a timing information acquirer for acquiring the event occurrence arrival timing information from the other image forming apparatus; and the processor includes:
- a difference calculator for calculating a difference between the elapsed time information calculated by the elapsed time information calculator and the event occurrence arrival timing information acquired by the timing information acquirer;
- a determiner for determining whether or not the difference calculated by the difference calculator has reached a predetermined limit value; and
- a controller for causing a predetermined operating mechanism to perform a corresponding operation predetermined as a measure against the specific event when the difference is determined to have reached the limit value by the determiner.

12. An image forming system in which an image forming apparatus and another image forming apparatus are network-connected, wherein the image forming apparatus includes:

an acquirer for requesting event information indicating a specific event having occurred in the other image forming apparatus via a network to the other image forming apparatus and acquiring the event information transmitted via the network in response to the request; and a processor for performing a predetermined process to deal with the specific event when the event information is acquired by the acquirer, wherein:

the event information includes event occurrence arrival timing information including elapse information indicating elapsed time from the first execution of a predetermined operation to the occurrence of the specific event in the operation in the other image forming apparatus and performance information indicating a performance of the other image forming apparatus;

the image forming apparatus further includes an elapsed time information calculator for calculating elapsed time information from the first execution of the operation to a time of execution of the operation when the operation is executed in the image forming apparatus;

the acquirer is a timing information acquirer for acquiring the event occurrence arrival timing information from the other image forming apparatus; and the processor includes:
- a performance information storage for storing one or a plurality of pieces of performance information indicating a performance of the image forming apparatus;
- a coinciding information extractor for extracting the event occurrence arrival timing information including the performance information of the other image forming apparatus coinciding with the performance information of the image forming apparatus stored in the performance information storage when the event occurrence arrival timing information is acquired by the timing information acquirer;
- a difference calculator for calculating a difference between the elapsed time information calculated by the elapsed time information calculator and the elapse information of the event occurrence arrival timing information of the other image forming apparatus extracted by the coinciding information extractor;
- a determiner for determining whether or not the difference calculated by the difference calculator has reached a predetermined limit value or less than the limit value; and
- a controller for causing a predetermined operating mechanism to perform a corresponding operation predetermined as a measure against the specific event when the difference is determined to have reached the limit value or less than the limit value by the determiner.

13. An image forming system in which an image forming apparatus and another image forming apparatus are network-connected, wherein the image forming apparatus includes:

an acquirer for requesting event information indicating a specific event having occurred in the other image forming apparatus via a network to the other image forming apparatus and acquiring the event information transmitted via the network in response to the request; and a processor for performing a predetermined process to deal with the specific event when the event information is acquired by the acquirer, wherein:

the image forming apparatus further includes a first event detector for detecting the specific event having occurred in the image forming apparatus;

the acquirer includes:

an event information requester for transmitting a transmission request for the event information indicating an event, which is of the same type as the specific event having occurred in the image forming apparatus and has occurred in the other image forming apparatus, to the network-connected other image forming apparatus when the specific event is detected by the first event detector; and an event information acquirer for acquiring the event information of the other image forming apparatus transmitted from the other image forming apparatus in response to the transmission request transmitted from the event information requester to the other image forming apparatus;

the processor includes a controller for causing a predetermined operating mechanism in the image forming apparatus to perform a predetermined corresponding operation when the event information of the other image forming apparatus is acquired by the event information acquirer; and the other image forming apparatus includes at least:
- a second event detector for detecting the event having occurred in the other image forming apparatus; and
- an event information transmitter for receiving the transmission request transmitted from the image forming apparatus and transmitting the event information indicating the event detected by the second event detector in response to the transmission request.

14. An image forming system in which an image forming apparatus, another image forming apparatus and a server are network-connected, wherein the image forming apparatus includes:

an acquirer for requesting event information indicating a specific event having occurred in the other image forming apparatus via a network to the server and acquiring the event information transmitted from the server via the network in response to the request; and a processor for performing a predetermined process to deal with the specific event when the event information is acquired by the acquirer, wherein:

the event information includes event occurrence arrival timing information indicating elapsed time from the first execution of a predetermined operation to the occurrence of the specific event in the operation in each of the image forming apparatus and the other image forming apparatus;

the image forming apparatus further includes:
an elapsed time information calculator for calculating elapsed time information from the first execution of the operation to a time of execution of the operation when the operation is executed in the image forming apparatus;
a timing information calculator for calculating the event occurrence arrival timing information of the image forming apparatus; and
a timing information transmitter for transmitting the event occurrence arrival timing information of the image forming apparatus calculated by the timing information calculator to the server;

the acquirer is a timing information acquirer for acquiring the event occurrence arrival timing information of the other image forming apparatus from the server;

the processor includes:
a difference calculator for calculating a difference between the elapsed time information calculated by the elapsed time information calculator and the event occurrence arrival timing information of the other image forming apparatus acquired by the timing information acquirer;
a determiner for determining whether or not the difference calculated by the difference calculator has reached a predetermined limit value; and
a controller for causing a predetermined operating mechanism to perform a corresponding operation predetermined as a measure against the specific event when the difference is determined to have reached the limit value by the determiner; and the server includes:
a timing information receiver for receiving the event occurrence arrival timing information transmitted from the timing information transmitter of the image forming apparatus;
a timing information storage for storing the event occurrence arrival timing information of the image forming apparatus received by the timing information receiver; and
a timing information output section for outputting the event occurrence arrival timing information of the other image forming apparatus stored in the timing information storage to the image forming apparatus requesting the transmission of this information.

15. An image forming system in which an image forming apparatus, another image forming apparatus and a server are network-connected, wherein the image forming apparatus includes:
an acquirer for requesting event information indicating a specific event having occurred in the other image forming apparatus via a network to the server and acquiring the event information transmitted from the server via the network in response to the request; and
a processor for performing a predetermined process to deal with the specific event when the event information is acquired by the acquirer, wherein:
the event information includes event occurrence arrival timing information including elapse information indicating elapsed time from the first execution of a predetermined operation to the occurrence of the specific event in the operation in each of the image forming apparatus and the other image forming apparatus and one or a plurality of pieces of performance information indicating performances of the image forming apparatus and the other image forming apparatus;

the image forming apparatus further includes:
an elapsed time information calculator for calculating elapsed time information from the first execution of the operation to a time of execution of the operation when the operation is executed in the image forming apparatus;
a timing information calculator for calculating the elapse information of the image forming apparatus;
a performance information storage for storing the performance information of the image forming apparatus; and
a timing information transmitter for transmitting the event occurrence arrival timing information including the elapse information calculated by the timing information calculator and the performance information stored in the performance information storage to the server;

the acquirer is a timing information acquirer for acquiring the event occurrence arrival timing information of the other image forming apparatus from the server;

the processor includes:
a coinciding information extractor for extracting the elapse information of the other image forming apparatus including the performance information of the other image forming apparatus coinciding with the performance information of the image forming apparatus stored in the performance information storage when the event occurrence arrival timing information of the other image forming apparatus is acquired by the timing information acquirer;
a difference calculator for calculating a difference between the elapsed time information calculated by the elapsed time information calculator and the elapse information of the other image forming apparatus extracted by the coinciding information extractor;
a determiner for determining whether or not the difference calculated by the difference calculator has reached a predetermined limit value or less than the limit value; and
a controller for causing a predetermined operating mechanism to perform a corresponding operation predetermined as a measure against the specific event when the difference is determined to have reached the limit value or less than the limit value by the determiner; and the server includes:
a timing information receiver for receiving the event occurrence arrival timing information transmitted from the timing information transmitter of the image forming apparatus;
a timing information storage for storing the event occurrence arrival timing information of the image forming apparatus received by the timing information receiver; and
a timing information output section for outputting the event occurrence arrival timing information of the other image forming apparatus stored in the timing information storage to the image forming apparatus requesting the transmission of this information.

16. An image forming system in which an image forming apparatus, another image forming apparatus and a server are network-connected, wherein the image forming apparatus includes:

an acquirer for requesting event information indicating a specific event having occurred in the other image forming apparatus via a network to the server and acquiring the event information transmitted from the server via the network in response to the request; and a processor for performing a predetermined process to deal with the specific event when the event information is acquired by the acquirer, wherein:

the event information includes information indicating the specific event having occurred in each of the image forming apparatus and the other image forming apparatus, the image forming apparatus includes:
  an event detector for detecting the specific event having occurred in the image forming apparatus;
  an event information transmitter for transmitting the event information indicating the detected event to the server when the specific event is detected by the event detector; and
  an event information requester for requesting the event information of the other image forming apparatus to the server;

the acquirer is an event information acquirer for acquiring the event information of the other image forming apparatus transmitted from the server in response to a request for the event information to the server by the event information requester;

the processor includes a first controller for causing a predetermined operating mechanism to perform a predetermined corresponding operation when the event information of the other image forming apparatus is acquired from the server by the event information acquirer; and the server includes:
an event information receiver for receiving the event information of the image forming apparatus transmitted from the event information transmitter;
an event information storage for storing the event information received by the event information receiver;
an event occurrence information transmitter for transmitting event occurrence information indicating the occurrence of the event; and
a second controller for determining whether or not the event information of the other image forming apparatus indicating the same type of event as an event indicated by the received event information is stored in the event information storage when the event information of the image forming apparatus is received by the event information receiver, and causing the event occurrence information transmitter to transmit the event occurrence information at least to the image forming apparatus when the event information of the other image forming apparatus is stored.

* * * * *